(12) United States Patent
Pak

(10) Patent No.: US 7,730,204 B2
(45) Date of Patent: Jun. 1, 2010

(54) EXTENSIBLE INTERFACE FOR INTER-MODULE COMMUNICATION

(75) Inventor: Wai H. Pak, Hercules, CA (US)

(73) Assignee: Siebel Systems, Inc., San Mateo, CA (US)

( * ) Notice: Subject to any disclaimer, the term of this patent is extended or adjusted under 35 U.S.C. 154(b) by 716 days.

(21) Appl. No.: 09/823,678

(22) Filed: Mar. 31, 2001

(65) Prior Publication Data

US 2007/0192415 A1 Aug. 16, 2007

(51) Int. Cl.
*G06F 15/173* (2006.01)
(52) U.S. Cl. ..................................... 709/238
(58) Field of Classification Search ............... 709/223, 709/203, 224, 226, 202, 206, 238, 217, 207; 705/21, 26

See application file for complete search history.

(56) References Cited

U.S. PATENT DOCUMENTS

| | | | | |
|---|---|---|---|---|
| 5,309,563 A | * | 5/1994 | Farrand et al. ............... | 709/216 |
| 5,473,680 A | | 12/1995 | Porter .................... | 379/221.15 |
| 5,506,898 A | | 4/1996 | Costantini et al. ........... | 379/266 |
| 5,524,147 A | | 6/1996 | Bean .......................... | 379/265 |
| 5,555,365 A | | 9/1996 | Selby et al. ................. | 395/159 |
| 5,594,791 A | | 1/1997 | Szlam et al. ................ | 379/265 |
| 5,699,361 A | | 12/1997 | Ding et al. ................... | 370/431 |
| 5,734,852 A | | 3/1998 | Zias et al. ................... | 395/334 |
| 5,754,830 A | | 5/1998 | Butts et al. .................. | 395/500 |
| 5,805,886 A | | 9/1998 | Skarbo et al. ............... | 395/685 |
| 5,828,882 A | | 10/1998 | Hinckley ................... | 395/680 |
| 5,852,732 A | | 12/1998 | Freund et al. ............... | 718/101 |
| 5,884,032 A | | 3/1999 | Bateman et al. ........ | 395/200.34 |
| 5,894,512 A | | 4/1999 | Zenner ....................... | 379/265 |
| 5,905,879 A | | 5/1999 | Lambrecht .................. | 395/297 |
| 5,915,011 A | | 6/1999 | Miloslavsky ................ | 379/219 |
| 5,928,325 A | | 7/1999 | Shaughnessy et al. ....... | 709/206 |
| 5,946,399 A | | 8/1999 | Kitaj et al. .................... | 380/49 |
| 5,961,620 A | | 10/1999 | Trent et al. .................. | 710/105 |
| 5,964,836 A | | 10/1999 | Rowe et al. ................. | 709/221 |
| 5,974,474 A | | 10/1999 | Furner et al. ................... | 710/8 |

(Continued)

FOREIGN PATENT DOCUMENTS

EP 1113656 A2 7/2001 .................... 3/523

(Continued)

OTHER PUBLICATIONS

International Search Report as mailed from the PCT on Feb. 28, 2003 for co-related WO Application (PCT/US02/31152; filed Sep. 30, 2002), 5 pages.

(Continued)

*Primary Examiner*—Benjamin R Bruckart
(74) *Attorney, Agent, or Firm*—Campbell Stephenson

(57) ABSTRACT

A method and apparatus for inter-module communication is disclosed. The method includes forming a message that includes customer relations management system information. The customer relations management system information may include, for example, agent information, work item information, queuing information, statistical information, connection information or rule information, among other such information. The message can be communicated in order to perform a function, such as an agent-related function, a work item-related function, a statistics-related function or an administrative function, for example. The message can be, for example, a command, a request or a notification.

72 Claims, 16 Drawing Sheets

U.S. PATENT DOCUMENTS

| | | | | |
|---|---|---|---|---|
| 5,983,019 | A | 11/1999 | Davidson | 395/705 |
| 6,058,435 | A | 5/2000 | Sassin et al. | 709/305 |
| 6,064,730 | A | 5/2000 | Ginsberg | 379/265 |
| 6,092,102 | A | 7/2000 | Wagner | 709/206 |
| 6,108,695 | A | 8/2000 | Chawla | 709/217 |
| 6,118,899 | A | 9/2000 | Bloomfield et al. | 382/233 |
| 6,134,318 | A | 10/2000 | O'Neil | 379/266 |
| 6,138,158 | A | 10/2000 | Boyle et al. | 709/225 |
| 6,154,209 | A | 11/2000 | Naughton et al. | 345/339 |
| 6,175,564 | B1 | 1/2001 | Miloslavsky et al. | 370/352 |
| 6,185,288 | B1* | 2/2001 | Wong | 709/206 |
| 6,199,104 | B1 | 3/2001 | Delph | 709/208 |
| 6,243,452 | B1 | 6/2001 | O'Shaughnessey et al. | 379/201 |
| 6,263,066 | B1 | 7/2001 | Shtivelman et al. | 379/266 |
| 6,300,947 | B1 | 10/2001 | Kanevsky | 345/333 |
| 6,314,178 | B1* | 11/2001 | Walker et al. | 379/266.01 |
| 6,314,451 | B1 | 11/2001 | Landsman et al. | 709/203 |
| 6,332,154 | B2 | 12/2001 | Beck et al. | 709/204 |
| 6,337,858 | B1 | 1/2002 | Petty et al. | 370/356 |
| 6,360,368 | B1 | 3/2002 | Chawla | 725/94 |
| 6,389,132 | B1 | 5/2002 | Price | 379/265.01 |
| 6,393,475 | B1* | 5/2002 | Leong et al. | 709/223 |
| 6,449,260 | B1 | 9/2002 | Sassin et al. | 370/270 |
| 6,449,646 | B1 | 9/2002 | Sikora et al. | 709/226 |
| 6,463,292 | B1 | 10/2002 | Rahman | 455/466 |
| 6,480,600 | B1 | 11/2002 | Neyman et al. | 379/265.09 |
| 6,493,695 | B1* | 12/2002 | Pickering et al. | 706/47 |
| 6,493,760 | B1 | 12/2002 | Pendlebury et al. | 709/229 |
| 6,507,868 | B2 | 1/2003 | Simmon et al. | 709/219 |
| 6,587,556 | B1 | 7/2003 | Judkins et al. | 379/219 |
| 6,594,675 | B1 | 7/2003 | Schneider | 707/200 |
| 6,625,274 | B1 | 9/2003 | Hoffpauir et al. | 379/229 |
| 6,657,990 | B1 | 12/2003 | Dilip et al. | 370/352 |
| 6,681,010 | B1 | 1/2004 | Anderson et al. | 379/265.01 |
| 6,690,788 | B1 | 2/2004 | Bauer et al. | 379/242 |
| 6,691,162 | B1 | 2/2004 | Wick | 709/224 |
| 6,694,352 | B1 | 2/2004 | Omoigui | 709/205 |
| 6,704,409 | B1 | 3/2004 | Dilip et al. | 379/265.02 |
| 6,718,370 | B1 | 4/2004 | Coffman et al. | 709/212 |
| 6,718,393 | B1 | 4/2004 | Aditya | 709/239 |
| 6,731,609 | B1 | 5/2004 | Hirni et al. | 370/260 |
| 6,744,878 | B1 | 6/2004 | Komissarchik et al. | 379/265.03 |
| 6,747,970 | B1 | 6/2004 | Lamb et al. | 370/352 |
| 6,763,369 | B1 | 7/2004 | Ytuarte et al. | 709/201 |
| 6,763,384 | B1 | 7/2004 | Gupta et al. | 709/224 |
| 6,771,760 | B1* | 8/2004 | Vortman et al. | 379/209.01 |
| 6,771,765 | B1 | 8/2004 | Crowther et al. | 379/265.09 |
| 6,772,216 | B1* | 8/2004 | Ankireddipally et al. | 709/230 |
| 6,778,661 | B1 | 8/2004 | Yumoto et al. | 379/265.09 |
| 6,816,500 | B1 | 11/2004 | Mannette et al. | 370/431 |
| 6,816,880 | B1 | 11/2004 | Strandberg et al. | 709/202 |
| 6,823,384 | B1* | 11/2004 | Wilson et al. | 709/225 |
| 6,832,203 | B1 | 12/2004 | Villena et al. | 705/8 |
| 6,879,586 | B2 | 4/2005 | Miloslavsky et al. | 370/356 |
| 6,944,272 | B1 | 9/2005 | Thomas | 379/88.13 |
| 6,963,783 | B1 | 11/2005 | Bi et al. | 700/94 |
| 6,978,311 | B1 | 12/2005 | Netzer et al. | 709/232 |
| 7,047,534 | B2 | 5/2006 | Sadovsky et al. | 719/322 |
| 7,051,066 | B1* | 5/2006 | Albert et al. | 709/202 |
| 7,092,509 | B1 | 8/2006 | Mears et al. | 379/266.01 |
| 7,093,199 | B2 | 8/2006 | Cragun et al. | 715/763 |
| 7,120,675 | B1 | 10/2006 | Shupak et al. | 709/217 |
| 7,263,547 | B2 | 8/2007 | Kloba et al. | 709/217 |
| 7,353,182 | B1* | 4/2008 | Missinhoun et al. | 705/8 |
| 7,392,540 | B1 | 6/2008 | Pell | 726/12 |
| 2001/0024497 | A1* | 9/2001 | Campbell et al. | 379/265.09 |
| 2001/0039596 | A1* | 11/2001 | Collin et al. | 709/321 |
| 2001/0042131 | A1* | 11/2001 | Mathon et al. | 709/238 |
| 2001/0054064 | A1* | 12/2001 | Kannan | 709/203 |
| 2002/0026335 | A1 | 2/2002 | Honda | 705/4 |
| 2002/0032809 | A1 | 3/2002 | Bateman et al. | 710/5 |
| 2002/0042845 | A1 | 4/2002 | Burmann et al. | 709/249 |
| 2002/0055967 | A1 | 5/2002 | Coussement | 709/202 |
| 2002/0072921 | A1 | 6/2002 | Boland et al. | 705/1 |
| 2002/0087385 | A1 | 7/2002 | Vincent | 705/10 |
| 2002/0144233 | A1 | 10/2002 | Chong et al. | 717/105 |
| 2003/0009520 | A1 | 1/2003 | Nourbakhsh et al. | 709/204 |
| 2003/0014598 | A1 | 1/2003 | Brown | 711/141 |
| 2003/0018702 | A1 | 1/2003 | Broughton et al. | 709/202 |
| 2003/0093533 | A1 | 5/2003 | Ezerzer et al. | 709/227 |
| 2004/0031030 | A1 | 2/2004 | Kidder et al. | 717/172 |
| 2005/0003812 | A1 | 1/2005 | Gladwin et al. | 455/426.1 |
| 2005/0010526 | A1 | 1/2005 | Takahashi et al. | 705/44 |

FOREIGN PATENT DOCUMENTS

| | | |
|---|---|---|
| WO | WO 97/16014 | 5/1997 |
| WO | WO 97/42728 | 11/1997 |
| WO | WO 00/49778 | 8/2000 |

OTHER PUBLICATIONS

International Search Report as mailed from the PCT on Jul. 12, 2002, for International Application No. PCT/US02/09879, 4 pages.

International Search Report as mailed from the PCT on Sep. 4, 2002, for International Application No. PCT/US02/10191, 4 pages.

GW Micro, Inc. "Window-Eyes 4.0 User's Guide," Mar. 3, 2001, pp. 1-286, Available at htm://web.archive.org/web/20010303133328/http:/www.gwmicro.com/wemanual/.

Schmidt, et al., Experiences with an Object-Oriented Architecture for Developing Dynamically Extensible Distributed System Management Software, Nov. 28-Dec. 2, 1994, pp. 500-506.

* cited by examiner

EXTENSIBLE INTERFACE FOR INTER-MODULE COMMUNICATION

BACKGROUND OF THE INVENTION

1. Field of the Invention

The present invention relates to communications between software modules, and, more particularly, to a method and apparatus providing an extensible interface for inter-module communication.

2. Description of the Related Art

In today's technological economy, companies are moving towards managing and interacting with their customers through a wide variety of communication channels. Such communication channels include face-to-face interaction, telephone communications, facsimile (colloquially, "fax") communications, e-mail, voice-mail, Internet information inquiries via "call me now and call me later," collaborative sessions via the Internet and other such communications channels. With all these communication channels, companies are faced with efficiently managing each customer interaction while meeting desired service levels and maximizing customer satisfaction. In addition, companies are faced with optimally staffing and training their workforce to deal with these communication channels, whether through their call center(s), telebusiness organizations, or their sales, marketing, and service professionals.

Currently, many customers have dedicated e-mail inboxes, fax inboxes, and voice-mail boxes defined for specific business areas as well as automated call distributors. Employees are assigned to poll and manage the inquiries for each communication channel. Combined with the traditional call queues for inbound telephone calls, agents are tasked with managing all these communication channels while having no visibility into the queue status and priorities of each channel.

Thus, it is desirable to provide a system that includes a universal queue strategy capable of assigning, routing, and queuing work items from multiple channels of communications to an agent having the appropriate skills to respond to the request. This reduces the response times and customer satisfaction, while balancing priorities amongst multiple communication channels.

As will be appreciated by those of skill in the art, the queuing of such work items may be performed by a software module dedicated to such tasks. Such a module would dole out work items to agents as appropriate, based on some paradigm. In providing such functionality in a separate module, the question of the manner in which such a module (and indeed, any such inter-module communications) are to take place.

A traditional approach would be to define a application programming interface (API) that would allow calls to be made to the queuing module, in order to produce the desired results (e.g., the queuing of a work item). Alternatively, a dynamic link library (DLL) could be employed. A DLL is a collection of sub-modules (e.g., subroutines or objects/methods), any of which can be called (instantiated) when needed by a program currently being executed in a computer. DLL files are so named because they are dynamically linked with the program that uses them during program execution rather than being compiler with the main program. Again, as with a library, an API is provided to allow the programmer to access the functions contained therein.

Unfortunately, by using a library or DLL, several obstacles can present themselves. First, the library or DLL may have what are termed "side effects"—that is, one or more of the sub-modules may cause unexpected changes in the data of the calling module. Moreover, if the calling module supplies data to the sub-module in the wrong format, the sub-module may simply take the incorrectly formatted data as data in the expected format, again producing unexpected results. Given there and other sources of errors, the time required to test and debug software thus created is increased substantially, as such effects are difficult to track down. Collaboration of different groups creating various modules is also affected, as the time required to integrate the module with the library/DLL is also increased. In fact, not only is the creation of software using such techniques error prone, but the maintenance of such systems also becomes more difficult, with the potential for small changes to the module and/or sub-modules to have catastrophic unforeseen effects. Thus, a way for modules to communicate that avoids the aforementioned problems is desirable, as such a technique would provide the requisite functionality without the potential burdens of increased development time, integration time and maintenance efforts.

SUMMARY OF THE INVENTION

In one embodiment of the present invention, a method of inter-module communication is disclosed. The method includes forming a message that includes customer relations management system information. The customer relations management system information may include, for example, agent information, work item information, queuing information, statistical information, connection information or rule information, among other such information.

In one aspect of this embodiment, the method further includes communicating the message from a commerce server to a universal queuing system. In another aspect of this embodiment, the method further includes forming a command, a request or a notification. The command can be defined such that a module receiving the message performs an operation, for example. The request can be configured to cause a module receiving the message to reply with other customer relations management system information, for example. The notification can include, for example, other customer relations management system information generated by a module generating the message. In yet another aspect of this embodiment, the message defines a function. The function, in turn, can be one of an agent-related function, a work item-related function, a statistics-related function and an administrative function.

In another embodiment of the present invention, a inter-module communication is disclosed. The inter-module communication includes message that includes customer relations management system information. The customer relations management system information may include, for example, agent information, work item information, queuing information, statistical information, connection information or rule information, among other such information.

In one aspect of this embodiment, the message may include, for example, a command, a request or a notification. The command can be configured to cause a module receiving the message to perform an operation. The request can be configured to cause a module receiving the message to reply with other customer relations management system information. The notification can include, for example, other customer relations management system information, that being generated by the module generating the message.

In another aspect of this embodiment, the message can be communicated in order to perform a function, such as an agent-related function, a work item-related function, a statistics-related function or an administrative function, for example.

In yet another embodiment of the present invention, a inter-module interface definition is disclosed. The inter-module interface definition includes a message definition. The message definition defines a message containing customer relations management system information. The customer relations management system information may include, for example, agent information, work item information, queuing information, statistical information, connection information or rule information, among other such information.

In one aspect of this embodiment, the message definition defines, for example, a command, a request or a notification. The command can be defined such that a module receiving the message performs an operation, for example. The request can be defined such that a module receiving the message replies with other customer relations management system information, for example. The notification can include, for example, other customer relations management system information, which is generated by a module generating the message.

In one aspect of this embodiment, the message defines a function. The function can be, for example, one of an agent-related function, a work item-related function, a statistics-related function or an administrative function.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1A:
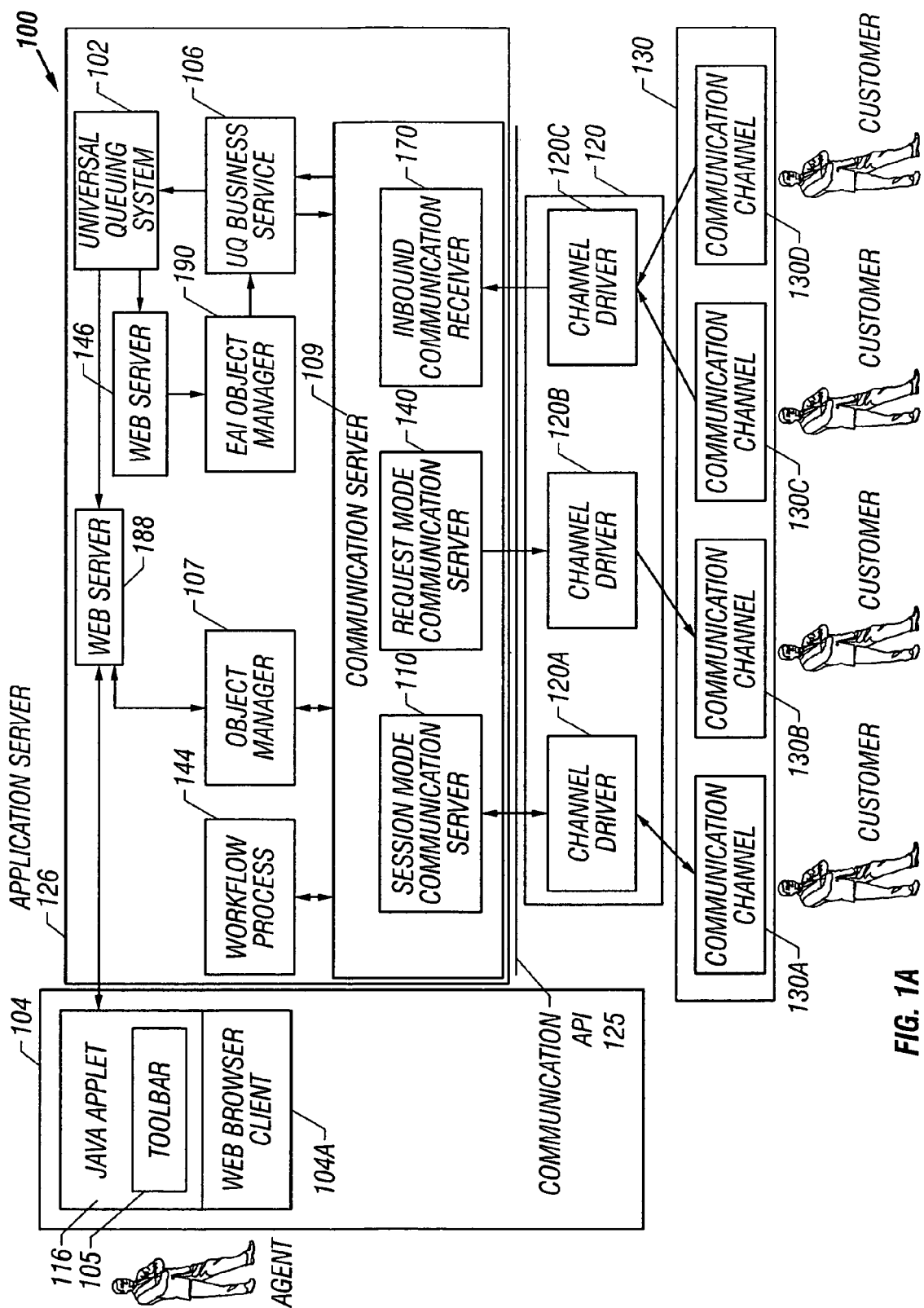
FIGS. 1A through 1D are a diagram of one embodiment of a system for enabling and scheduling agents to respond to customer support requests and/or information requests via multiple communication channels of different media types.

The following is intended to provide a detailed description of an example of the invention and should not be taken to be limiting of the invention itself. Rather, any number of variations may fall within the scope of the invention which is defined in the claims following the description.

Introduction

The present invention provides a method and apparatus for providing an extensible interface for inter-module communication. An inter-module interface can be described that allows communication of application-specific information between modules in the systems described subsequently herein. The basic unit of communications using the interface is a message that can be, for example, a command (a directive that is to cause the recipient to do something), a request (in response to which the recipient replies with requested information) or a notification (notifying the recipient of some event or autonomously providing information of some sort).

A method and apparatus for inter-module communication typically includes forming a message that includes customer relations management system information. This will typically be done in accordance with the inter-module communications required by the system, as well as in accordance with the various protocols and languages employed. The customer relations management system information may include, for example, agent information, work item information, queuing information, statistical information, connection information or rule information, among other such information. The message can be communicated in order to perform a function, such as an agent-related function, a work item-related function, a statistics-related function or an administrative function, for example. The message can be, for example, a command, a request or a notification.

An inter-module interface such as that described above provides a number of benefits. Such an interface effectively isolates the two modules communicating with one another. This avoids problems described subsequently. Also, the time required to test and debug software thus created is decreased substantially, improving collaboration between different development groups.

An inter-module interface such as that described herein also supports operation in a platform independent manner. Because the only contact the modules have with one another is the transmission and reception of messages structured in a previously agreed upon format. Additionally, because each message (e.g., command, request, notification and other such messages) can be coded separately, the code in each module for performing the requisite function (e.g., a specific command) can also be coded separately. This greatly simplifies the coding of each module, as it engenders an incremental approach. Extending the interface is also simplified, as discussed subsequently. Other advantages are also provided, some of which are discuss in detail subsequently.

An Extensible Interface for Inter-Module Communication

The present invention employs various standard networking protocols and languages in supporting the communications described herein. Among these protocols and languages are the Extensible Markup Language, the Simple Object Access Protocol and the Hyper-Text Transfer Protocol.

Extensible Markup Language (XML) is a language used to describe a class of data objects called XML documents and also describes, in part, the behavior of computer programs which process them. XML is an application profile (or restricted form) of SGML, the Standard Generalized Markup Language defined in ISO 8879. By construction, XML documents are conforming SGML documents. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure. A software module called an XML processor is used to read XML documents and provide access to their content and structure. It is assumed that an XML processor is doing its work on behalf of another module, called the application.

Simple Object Access Protocol (SOAP) is a lightweight protocol that supports the exchange of information in a decentralized, distributed environment using XML. SOAP does not itself define any application semantics such as a programming model or implementation specific semantics; rather it defines a simple mechanism for expressing application semantics by providing a modular packaging model and encoding mechanisms for encoding data within modules. This allows SOAP to be used in a large variety of systems ranging from messaging systems to RPC. It is an XML-based protocol that consists of three parts: an envelope that defines a framework for describing what is in a message and how to process it, a set of encoding rules for expressing instances of application-defined datatypes, and a convention for representing remote procedure calls and responses. SOAP can potentially be used in combination with a variety of other protocols; however, the bindings typically used support the use of SOAP in combination with HTTP and HTTP Extension Framework (although such communications can be made secure through the use of HTTPs, the secure version of HTTP).

As noted, SOAP consists of three parts:
1. The SOAP envelope construct defines an overall framework for expressing what is in a message; who should deal with it, and whether it is optional or mandatory.
2. The SOAP encoding rules defines a serialization mechanism that can be used to exchange instances of application-defined datatypes.
3. The SOAP RPC representation defines a convention that can be used to represent remote procedure calls and responses.

Although these parts are described together as part of SOAP, they are functionally orthogonal. In particular, the envelope and the encoding rules are defined in different namespaces in order to promote simplicity through modularity.

A SOAP message is an XML document that consists of a mandatory SOAP envelope, an optional SOAP header, and a mandatory SOAP body. This XML document is referred to as a SOAP message. The namespace identifier for the elements and attributes defined in this section is defined in a URL that provides the namespace information. A SOAP message contains the following:
1. The Envelope is the top element of the XML document representing the message.
2. The Header is a generic mechanism for adding features to a SOAP message in a decentralized manner without prior agreement between the communicating parties. SOAP defines a few attributes that can be used to indicate who should deal with a feature and whether it is optional or mandatory.
3. The Body is a container for mandatory information intended for the ultimate recipient of the message. SOAP defines one element for the body, which is the Fault element used for reporting errors.

Grammar rules exist for the envelope, header, and body sections of a message. An envelope has an element name of "Envelope," and must appear in the message. A header has an element name of "Header," and may appear in the message, but is not mandatory. The body of the message has an element name of "Body," and must appear in the message.

SOAP messages are fundamentally one-way transmissions from a sender to a receiver. However, SOAP messages can be combined to implement patterns such as request/response paradigms. SOAP implementations can be optimized to exploit the unique characteristics of particular network systems. For example, the HTTP binding provides for SOAP response messages to be delivered as HTTP responses, using the same connection as the inbound request.

Regardless of the protocol to which SOAP is bound, messages are routed along a so-called "message path", which allows for processing at one or more intermediate nodes in addition to the ultimate destination. A SOAP application receiving a SOAP message processes the message by performing the following actions:
1. Identify all parts of the SOAP message intended for that application
2. Verify that all mandatory parts identified in the preceding are supported by the application for this message and process them accordingly. If this is not the case then discard the message. The processor may ignore optional parts identified in the preceding step without affecting the outcome of the processing.
3. If the SOAP application is not the ultimate destination of the message then remove all parts identified in step 1 before forwarding the message.

Processing a message or a part of a message requires that the SOAP processor understands, among other things, the exchange pattern being used (one way, request/response, multicast, etc.), the role of the recipient in that pattern, the employment (if any) of RPC mechanisms, the representation or encoding of data, as well as other semantics necessary for correct processing.

While attributes such as the SOAP encodingStyle attribute can be used to describe certain aspects of a message, the SOAP specification does not mandate a particular manner in which the recipient makes such determinations in general. For example, certain applications will understand that a particular element signals an RPC request using one set of predefined conventions, while another application may infer that all traffic directed to that application is encoded as one way messages.

Hyper-Text Transfer Protocol (HTTP) is the network protocol used to deliver virtually all files and other data (collectively called resources) on the World Wide Web, whether the files are HTML files, image files, query results, or other such collection of data. HTTP typically operates using Transmission Control Protocol/Internet Protocol (TCP/IP) sockets. A browser or other application is an HTTP client because the application sends requests to an HTTP server (i.e., Web server), which then sends responses back to the client. The standard (and default) port for HTTP servers to listen on is port 80, although HTTP servers can use any port.

HTTP is used to transmit resources, not just files. A resource is a unit of information that can be identified by a universal resource locator (URL). The most common kind of resource is a file, but a resource may also be a dynamically-generated query result, the output of a script, a document available in several languages, or other such information. Typically, however, most HTTP resources are currently either files or server-side script output Using XML and SOAP, an inter-module interface can be described that allows communication of application-specific information between modules in the systems described subsequently herein. The basic unit of communications using the interface is a message that can be, for example, a command (a directive that is to cause the recipient to do something), a request (in response to which the recipient replies with requested information) or a notification (notifying the recipient of some event or autonomously providing information of some sort).

The basic format for communications using the interface is as follows:

```
<message>
    <name tag> value </name tag>
    <name tag> value </name tag>
        .
        .
        .
    <name tag> value </name tag>
</command/request/notification >
```

As will be apparent to one of skill in the art, other constructs may appear in one or more of the elements thus defined (e.g., the use of an <array element>). Moreover, each of the name tag elements can be defined to include name tag elements of their own, and so on. It will be noted that, as discussed above, that the XML document containing the "data" (the particulars of the command) is sent via HTTP (or HTTPs, as the case may be) by first encasing the XML document in a SOAP envelope, which allows the definition of the data types, configuration, the command, request or notification being sent, and other such information as is appropriate to the command, request or notification being sent.

More specifically, the format for communications using the interface appears as follows:

```
<element name='command/request/notification'>
    <type>
        <element name='element1' type='element1type'/>
        <element name='element2' type='element2type'/>
            .
            .
            .
        <element name='elementN' type='elementNtype'/>
    </type>
</element>
``` where the element name can be one of "command", "request" and "notification" among other such possible messages. Other examples of such messages are provided subsequently herein. It will be noted that multiple XML messages can be encased in a single SOAP envelope, providing more efficient transfer of commands/requests/notifications. By defining the inter-module interface in this manner, the concept of an application programming interface (API) is effectively done away with—what is used in its place is a data format specification, an example of which appears in the Appendix filed herewith that includes XML code that implements an extensible interface for inter-module communication according to the present invention such as that described herein and which is discussed in detail below. This application incorporates by reference herein, in its entirety, that Appendix.

It will be noted that the variable identifier "N" is used both above and in several instances in the figures to more simply designate the final element (e.g., elementN and elementNtype) of a series of related or similar elements (e.g., elements and types). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

An inter-module language such as that described above provides a number of benefits. As an initial matter, such an effectively isolates the two modules communicating with one another. This avoids any unwanted "side effects," because the modules are compiled and executed separately. The only link between the two modules is the communication channel provided by HTTP, TCP/IP and related protocols. The opportunity for inadvertent type mismatches is also avoided, as a result of all values being converted into character representations (which occurs when generating the XML for the message Moreover, if the calling module supplies data to the sub-module in the wrong format, the sub-module may simply take the incorrectly formatted data as data in the expected format, again producing unexpected results. Given there and other sources of errors, the time required to test and debug software thus created is increased substantially, as such effects are difficult to track down. Collaboration of different groups creating various modules is also affected, as the time required to integrate the module with the library/DLL is also increased. In fact, not only is the creation of software using such techniques error prone, but the maintenance of such systems also becomes more difficult, with the potential for small changes to the module and/or sub-modules to have catastrophic unforeseen effects. Thus, a way for modules to communicate that avoids the aforementioned problems is desirable, as such a technique would provide the requisite functionality without the potential burdens of increased development time, integration time and maintenance efforts.

An inter-module interface such as that described herein also supports operation in a platform independent manner. Because the only contact the modules have with one another is the transmission and reception of messages structured in a previously agreed upon format. The platform on which a given module is executed, the language in which the module is written, the conventions used in the module and other platform-specific information are immaterial—so long as the module sending the message puts the proper information in the proper format into the message, no issues will exist as to the manner in which this is accomplished. It is, of course, considered a given that the receiver will not encounter any problems in reading the message, because it is assumed that the message is properly formatted and the receiving module expects the message in the agreed upon format.

Given this platform independence, it will be apparent to one of skill in the art that such an interface can be expected to avoid compatibility problems. Again, so long as the modules are using the same version of the interface, no errors will result from mismatches between the transmitted message and the message expected by the receiving module. The interface thus completely defines the interaction between the modules because the modules are completely separate. This allows the modules to be unit tested with a high confidence that successful unit testing will portend successful integration. This ease of integration is further supported the use of standard networking protocols and languages. Typically, the only integration problems will be those caused by mismatches between developer's understanding of the interface specification, which are easily remedied, typically. Thus, the time spent in development and debugging is reduced, speeding time-to-market and lowering the cost of developing the software system being implemented.

Additionally, because each message (e.g., command, request, notification and other such messages) can be coded separately, the code in each module for performing the requisite function (e.g., a specific command) can also be coded separately. This greatly simplifies the coding of each module, as it engenders an incremental approach.

This also implies that extending interface to perform other functions is simplified. To add functionality, the developer simply describes one or more new messages that address the desired function. The modules' developers agree on the structure of the message, and proceed with creating additional code for their respective modules. This coding is simplified because each command is a separate path through the given module. Thus, encapsulation and code re-use are supported in the code that employs such an inter-module interface.

Finally, an inter-module interface according to embodiments of the present invention are network extensible. Because an inter-module interface such as that described herein uses standard networking protocols and languages, communications can take place within one computer or over a network. In fact, so long as compatible protocols and languages are employed, the modules communicating with one another can be located anywhere. In fact, an application service provider (ASP) model can even be used, with one module (e.g., UQ) acting as the ASP and the other (e.g., CS) acting as the client.

An example of a system in which the present invention can be used, as well as an embodiment of the present invention, is provided below, in connection with the description of such a system.

An Example Implementation of an Extensible Inter-Module Communication Interface

Example Communications Server and Associated Systems

FIGS. 1A through 1D are a diagram of one embodiment of a client/server system 100 for enabling agents to respond to customer support requests and/or information requests via multiple communication channels of different media types. These media types include, but are not limited to, telephone, e-mail, fax, web collaboration, Internet "call-me-now" and "call-me-later", web chat, wireless access protocol, paging, and short messaging services. The term customer is used herein to include individuals and contact persons at businesses that are customers of the company, potential customers and other persons with whom a customer support agent communicates.

FIG. 1A shows that four customers have submitted customer support requests to the client/server system 100 and three agents are responding to customer support requests. The four customers submitted the customer support requests via four communication channels 130, such as communication channels 130A, 130B, 130C, and 130D. In one embodiment, at least two of the four communication channels support different media types.

In accordance with the present invention, client/server system 100 includes a universal queuing (UQ) system 102 capable of assigning, routing, and queuing work items from multiple channels of communication to an agent having the appropriate skills to respond to a customer support request. The term work item refers to a request from a customer that requires a response from an agent assigned by client/server system 100, such as responding to a customer support request in the form of a telephone call, e-mail, fax or other communication of a different media type. A work item can be initiated when an event such as an incoming customer support request arrives or by an agent using a user interface to client/server system 100.

Client/server system 100 also includes a communication server 109 that enables agents to use communication channels of different media types to communicate with customers. Communication server 109 handles events such as the arrival of incoming customer support requests from a channel driver 120 such as one of channel drivers 120A, 120B, and 120C. Each channel driver 120 communicates with a communication channel 130 such as one of communication channels 130A, 130B, 130C and 130D.

Interaction between UQ system 102 and communication server 109 occurs when, for example, communication server 109 receives and routes an incoming customer request as a work item to UQ system 102 for assignment to an agent. UQ system 102 assigns an agent to the work item and identifies an assigned agent to communication server 109 for communication concerning the work item to the assigned agent.

Web browser client 104A includes a web browser program such as Microsoft's Internet Explorer running on a client computer system (not shown). The web browser client 104A communicates with a web server 188. Application server 126 in client/server system 100 performs functions for and sends information to web browser client 104A via web server 188, which provides web pages for web browser client 104A to display. Web server 188 can download program instructions, such as Java applet 116, to the web browser client 104A to provide additional functionality, such as a user interface.

Web browser client 104A is shown including a toolbar 105. One of skill in the art will recognize that other user interfaces providing the functionality of toolbar 105 can be implemented using a variety of different display formats to interface with multiple communication channels of different media types within the scope of the invention. Toolbar 105 is presented as part of a user interface.

In one embodiment, application server 126 of client/server system 100 includes object manager 107, session mode communication server 110, request mode communication server 140, inbound communication receiver 170, UQ system 102, web server 188, web server 146, Enterprise Application Interface (EAI) object manager 190, and workflow process 144. In one embodiment, communication between components in application server 126 is enabled using a suitable inter-process communication protocolin conjunction with transfer control protocol/Internet protocol (TCP/IP) as known in the art.

UQ business service 106 allows communication server 109 to request information from UQ system 102, which returns the information via web server 146, and EAI object manager 190. In one embodiment, both session mode communication server 110 and inbound communication receiver 170 can communicate with UQ system 102. Other embodiments can communicate with a third party queuing system for maintaining work item queues and assigning agents to work items.

Communication server 109 includes at least one of session mode communication server 110, request mode communication server 140, and inbound communication receiver 170. It is important to note that the functionality provided by servers 110, 140, and 170 can be implemented on one server computer system or distributed across two or more server computer systems. Communication server 109 handles all communication between agents and customers via communication channels 130 of one or more media types. Communication server 109 is not media-specific and has no knowledge of communication channels or media.

To communicate with multiple communication channels of different media types, communication server 109 is designed to communicate with a channel driver 120 such as one of channel drivers 120A, 120B, and 120C. A channel driver 120 is written according to Communication Application Program Interface (API) 125. Communication API 125 provides an interface for third party vendors of communication devices and software (e.g., middleware vendors for communication devices) to provide a channel driver 120 so that their products are compatible with application server 126. By implementing a channel driver 120, vendors can take advantage of the customer support center management features and multi-media communication channel capabilities of application server 126.

Communication API 125 is designed to provide flexibility to third party vendors for integrating their products. In the implementation of a channel driver, a vendor defines the commands the vendor's communication channel 130 understands so that communication server 109 can issue commands for the communication channel 130 to perform. Normally these commands are issued when session mode communication server 110 is presenting a user interface to the agent, although inbound communication receiver 170 also can send commands in some circumstances.

In addition, the vendor defines the events that the vendor's communication channel 130 provides regarding activity of a specific communication channel 130. Finally, the vendor provides a channel driver 120 implementation, such as a dynamic link library (.DLL file), for performing each command and generating and providing each event. The channel driver 120 implementation is required by communication API 125 to include code to instantiate a driver object and at least one service object.

By requiring the vendor to provide facilities for the communication server 109 to issue commands to and to receive information from the vendor's communication channel 130, communications API 125 enables communications server 109 to operate independently of the communication channel 130 media type and specific protocols to communicate with the vendor's communication device or software.

Figure 1B:
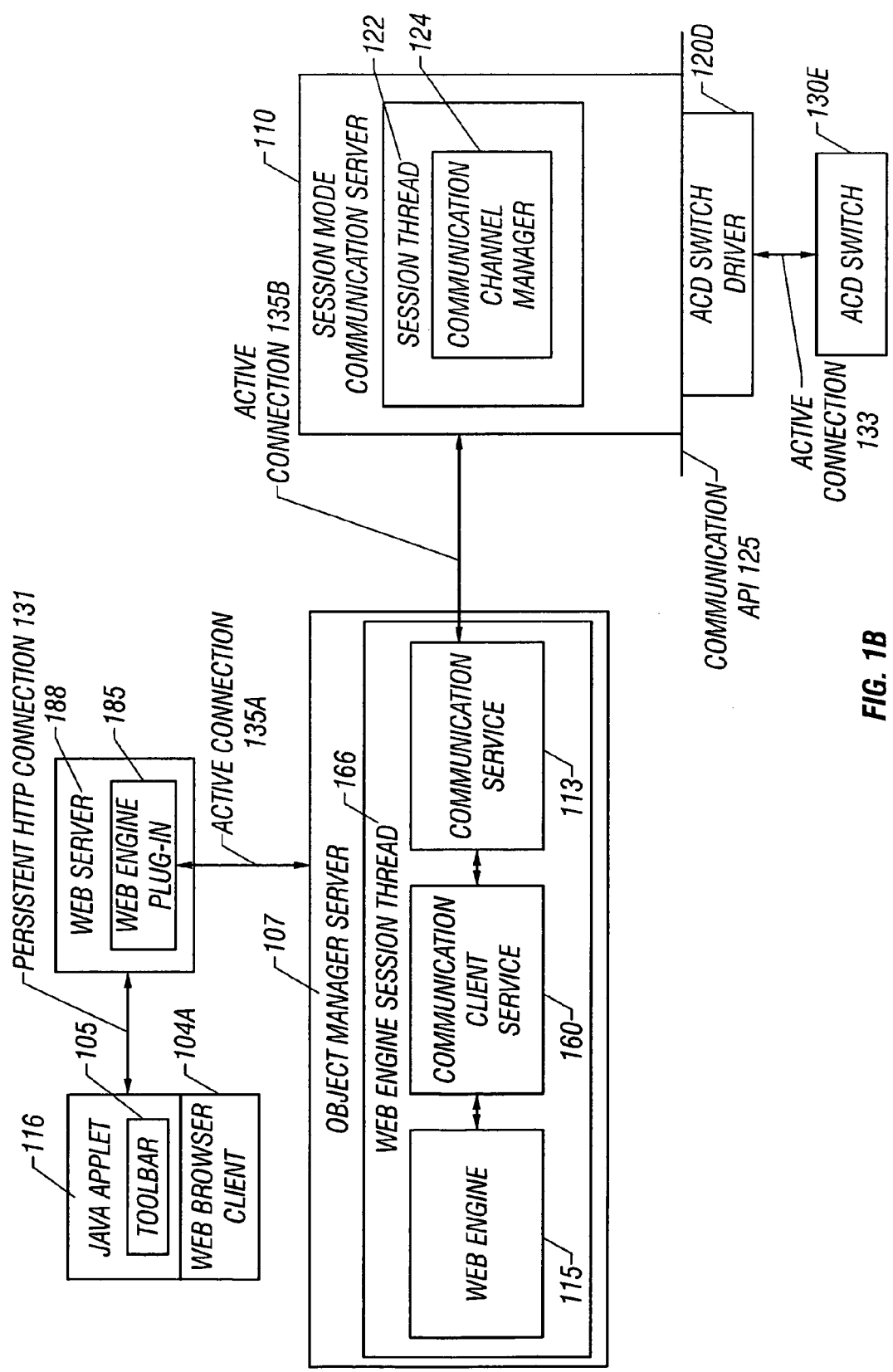
Figure 1C:
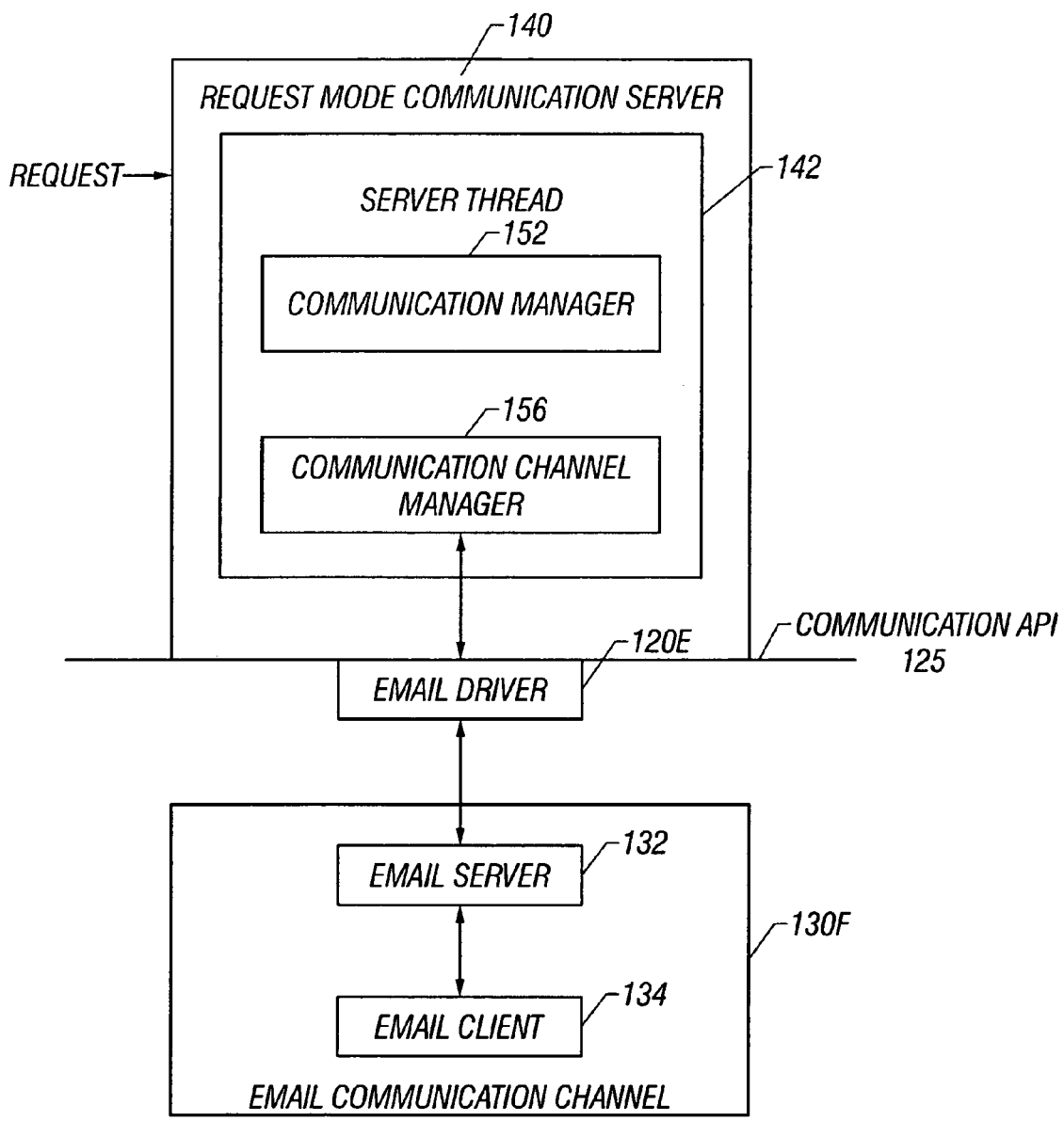
Figure 1D:
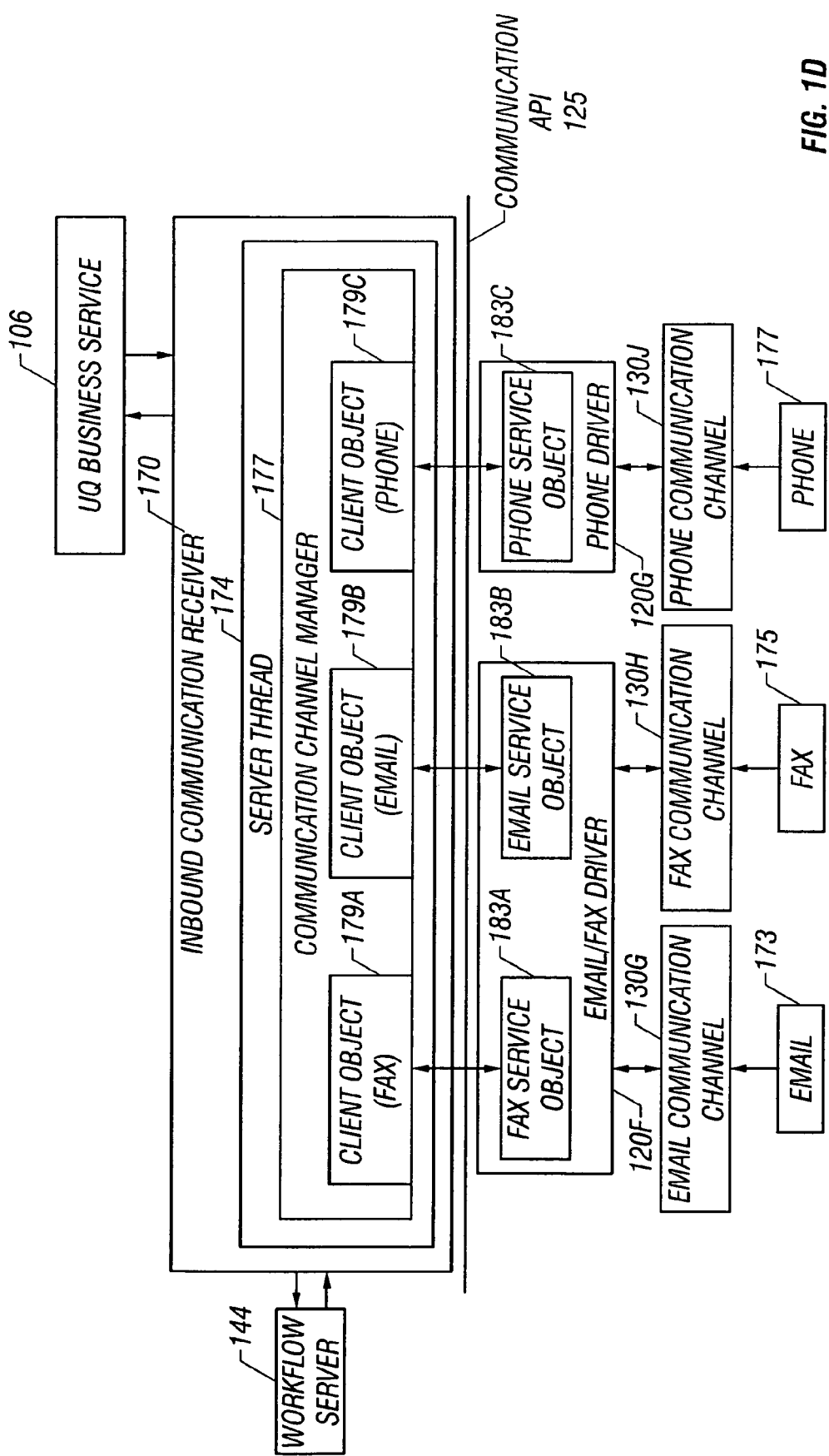
Figure 1E:
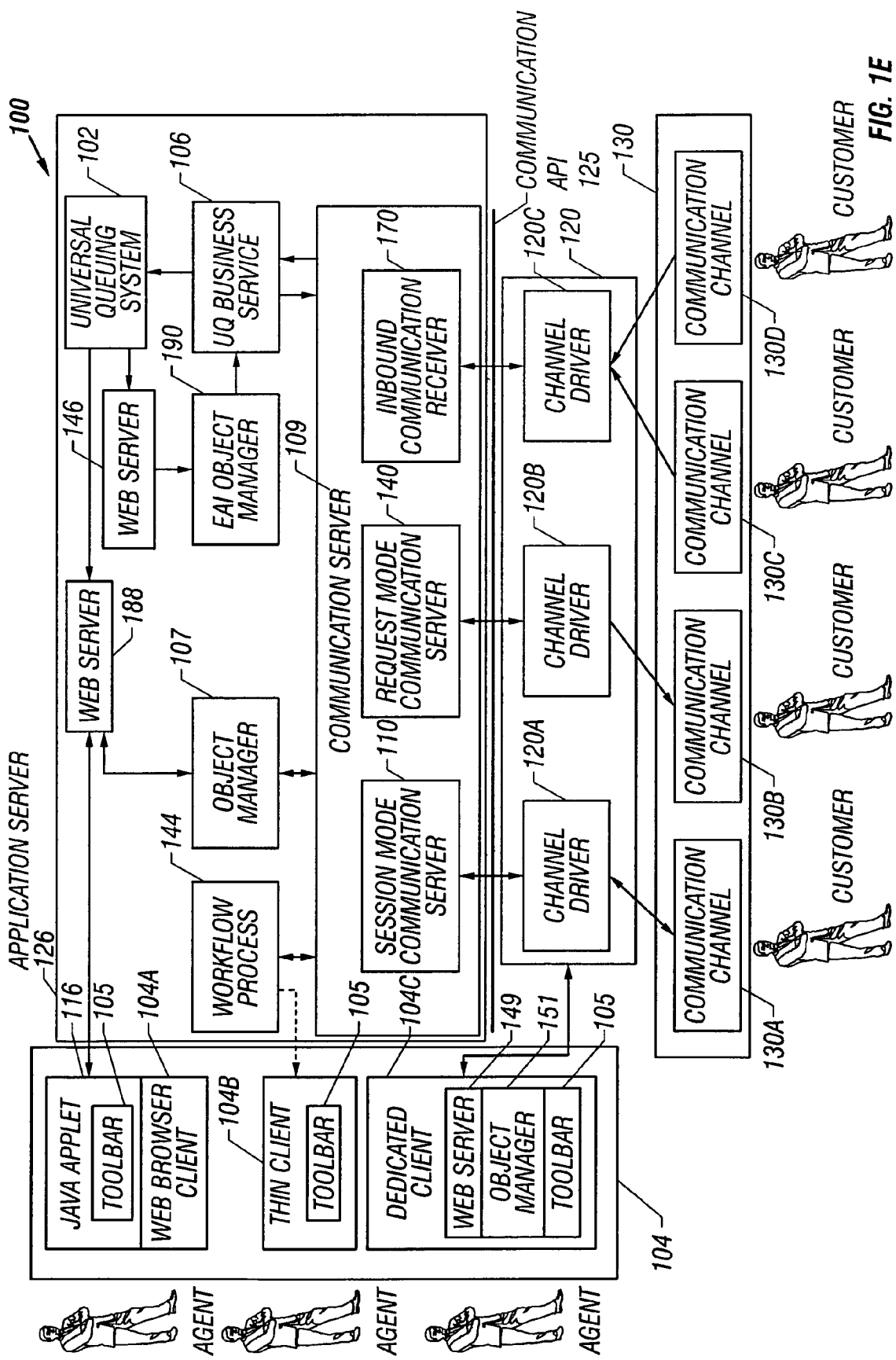
FIG. 1E is a diagram of another embodiment of a system for enabling and scheduling agents to respond to customer support requests and/or information requests via multiple communication channels of different media types.
Figure 1F:
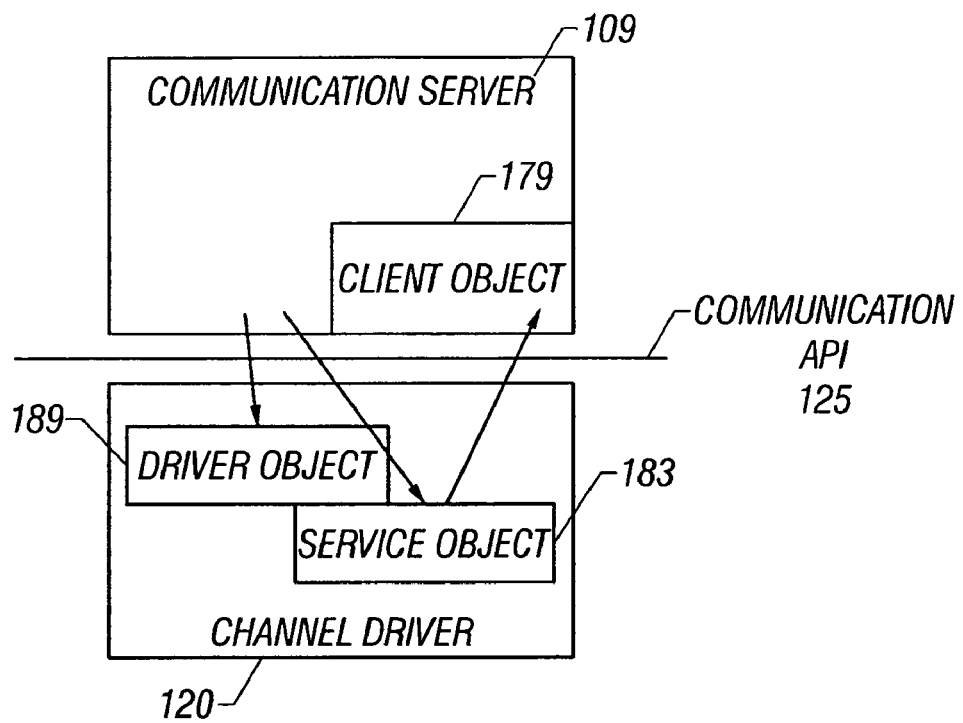
FIG. 1F is a diagram of components included in an implementation of a communication application programming interface.
Figure 1G:
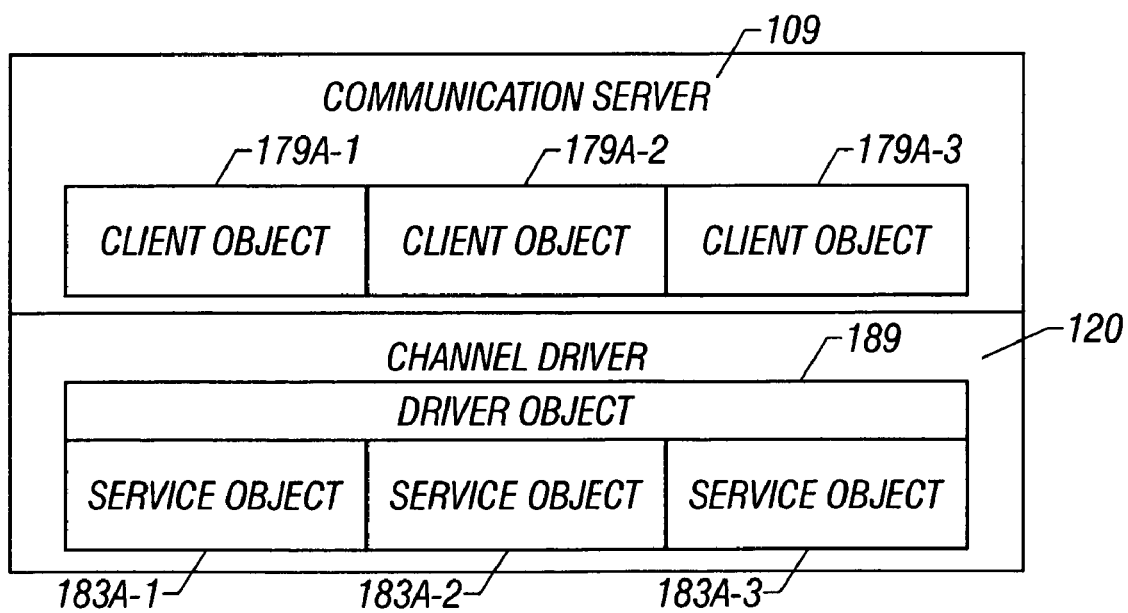
FIG. 1G is a diagram of components included in another implementation of a communication application programming interface.
Figure 1H:
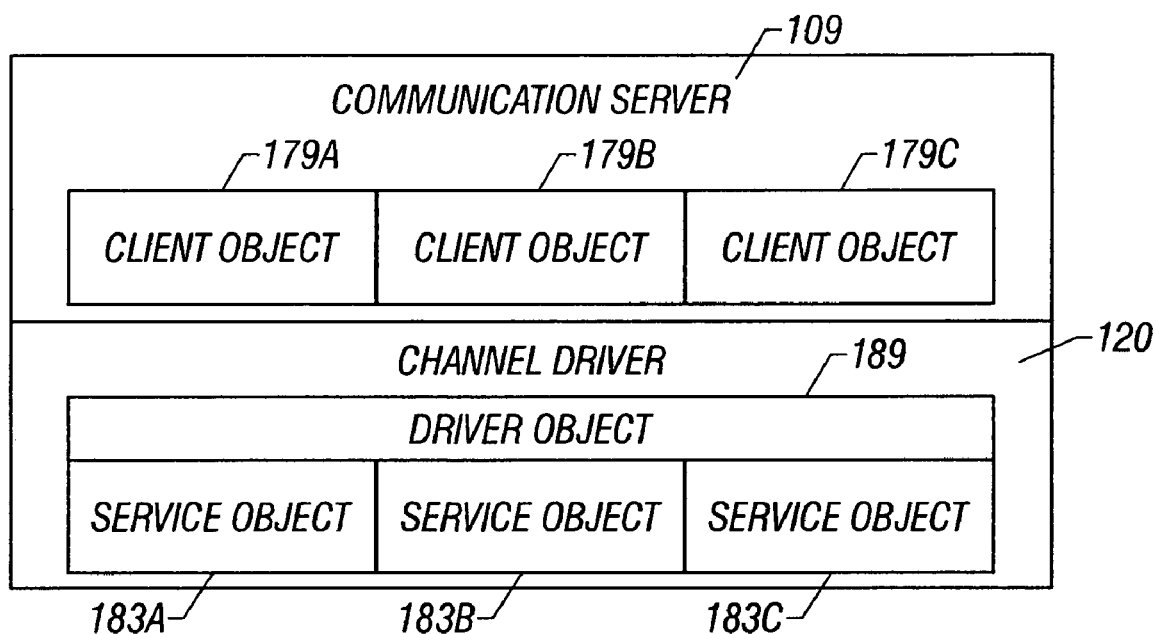
FIG. 1H is a diagram of components included in another implementation of a communication application programming interface.
Figure 1I:
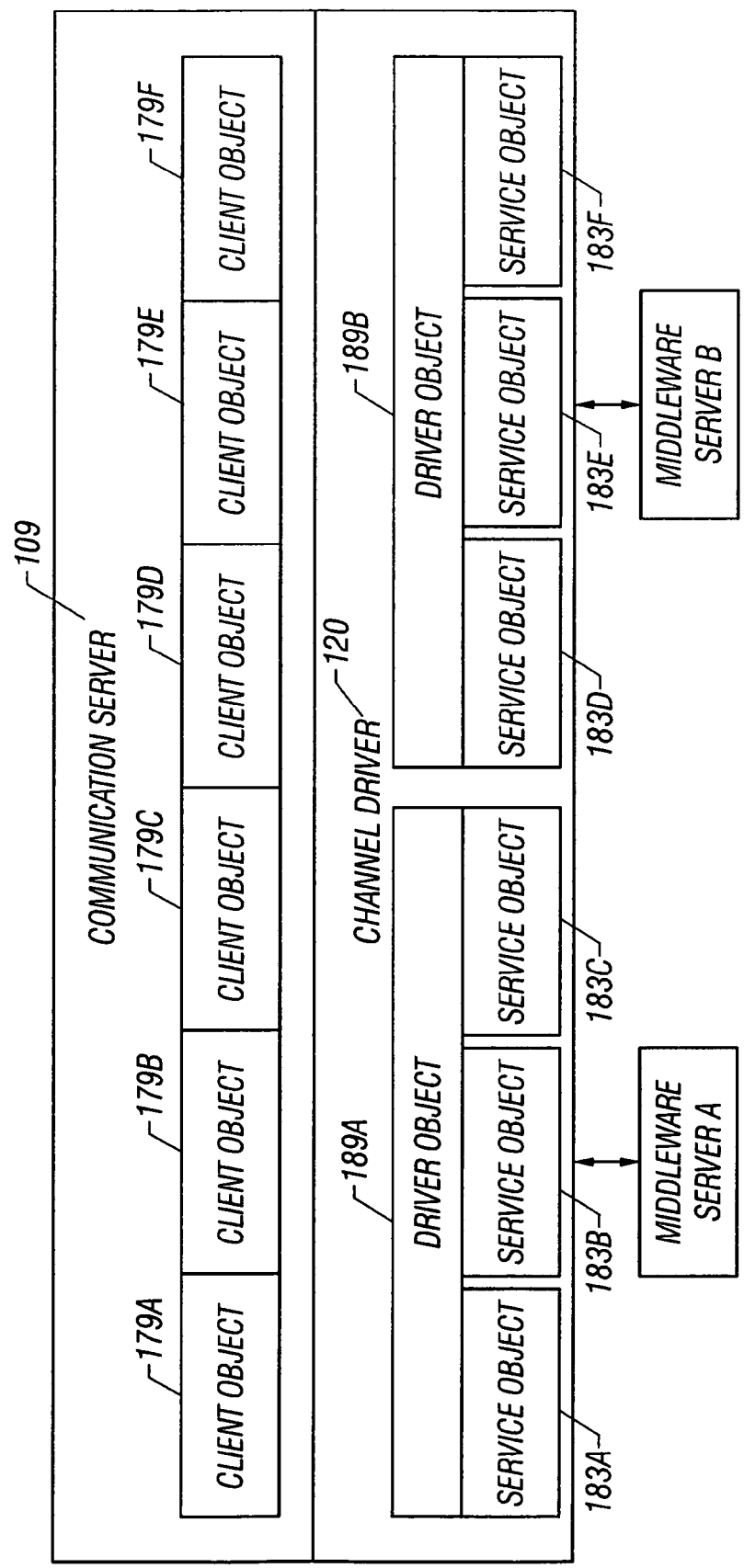
FIG. 1I is a diagram of components included in another implementation of a communication application programming interface.
Figure 1J:
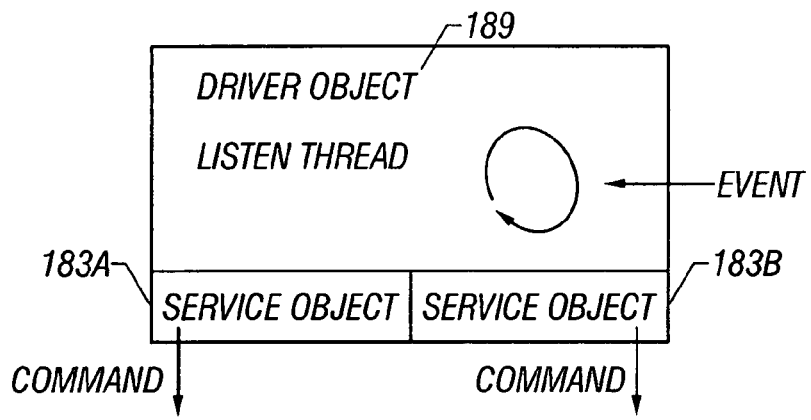
FIG. 1J is a diagram of components included in another implementation of a communication application programming interface.
Figure 1K:
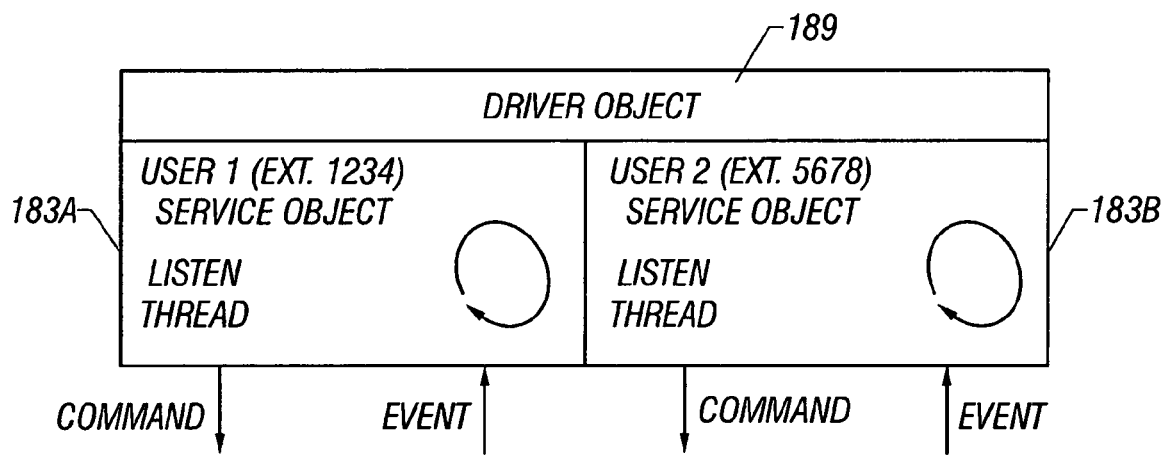
FIG. 1K is a diagram of components included in another implementation of a communication application programming interface.
Figure 2A:
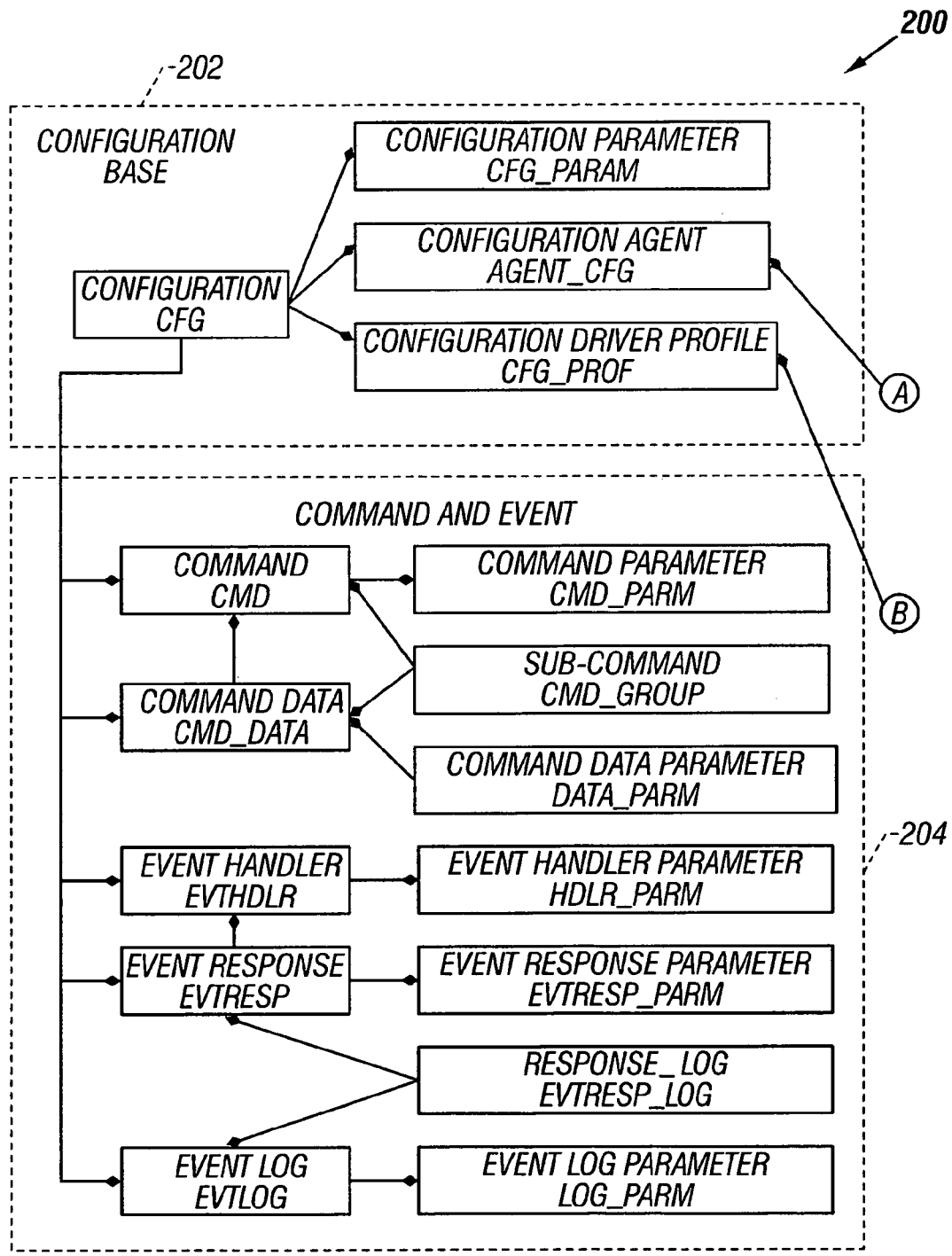
FIG. 2 shows an example of a database scheme for the system of FIGS. 1A through 1D.
Figure 2B:
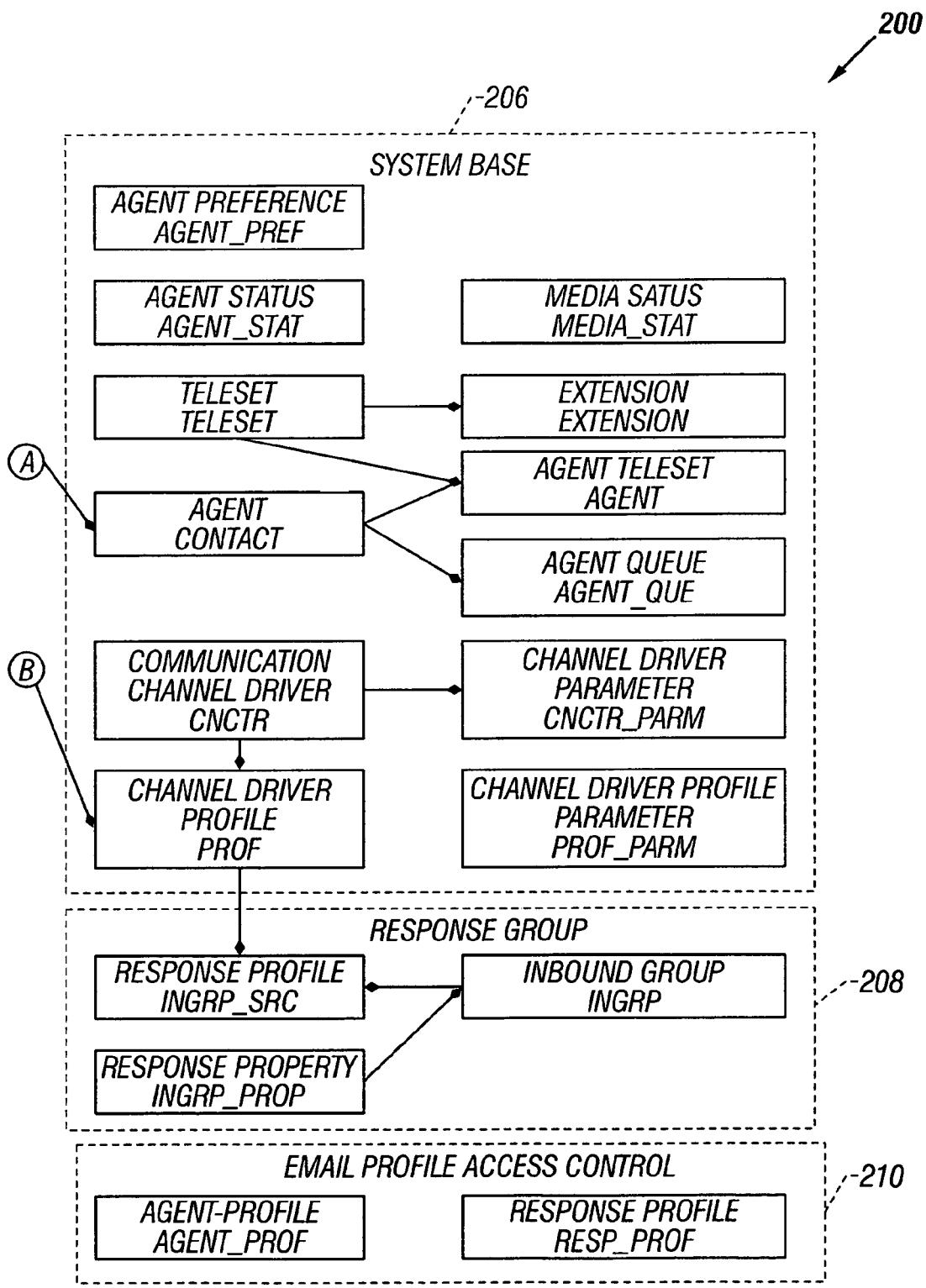
Figure 3:
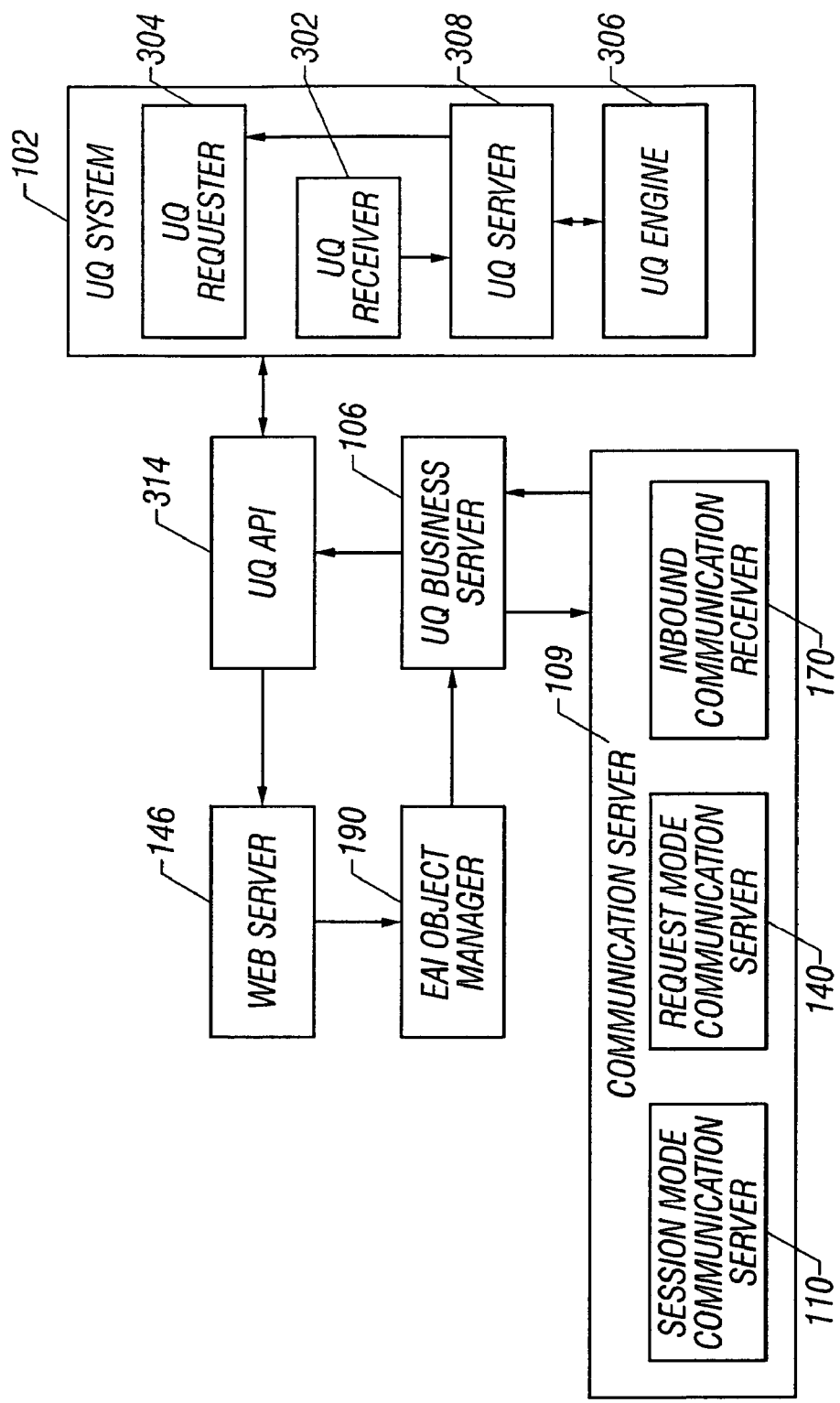
FIG. 3 shows one embodiment of a universal queuing system in accordance with the present invention.

Referring to FIG. 2, an example of a database schema 200 that can be used by client/server system 100 (FIG. 1) for storing and communicating channel driver information, agent limitations on media access, commands and events, inbound task management, agent preferences, agent status, media status, communication channel configurations, multiple queue support, and agent management is shown. Database schema 200 includes data structures for configuration base 202, command and event 204, system base 206, response group 208, and e-mail profile access control 210.

Examples of tables corresponding to table names in FIG. 2 are provided in U.S. patent application Ser. No. 09/823,590, "System and Method for Multi-Channel Communication Queuing," which application was filed on the same day and is assigned to the same assignee as the present application and is incorporated by reference herein. It will be noted that, for simplicity of presentation, FIG. 2 does not indicate all of the relationships between the tables, and that many instances of a table may exist for a particular configuration, depending on the number and types of communication channels authorized. Additionally, one skilled in the art will realize that this collection of tables, the parameters included in each table, and the storage space allowed for the parameters, is one example of how the database schema may be configured, and that other suitable arrangements can be used in accordance with the present invention.

FIG. 1B shows a detailed view of one embodiment of session mode communication server 110. Session mode communication server 110 maintains knowledge of clients 104 to which it is connected, here web browser client 104A. When a communication from communication channel 130, here ACD switch 130E is received, communication server 109 dispatches the request to the appropriate server component in client/server system 100 for execution.

Session thread 122 represents a session during which an agent interacts with client/server system 100 using web browser client 104A. A customer uses a customer communication device, here a telephone, to access the communication channel. The agent also uses a communication device, such as a telephone headset, to access the communication channel.

Session thread 122 listens for inputs from its web browser client 104A and dispatches notifications of events from ACD switch driver 120 to web browser client 104A. Session thread 122 uses a communication channel manager such as communication channel manager 124 to interact with a ACD switch driver 120. Each channel driver 120 provides an active connection such as active connection 133 between the client and the associated communication channel. Channel driver 120 can be implemented to establish a persistent connection for interactive communication between client 104 and communication channel 130E but providing a persistent connection is not required by communication API 125.

The following examples describe processes that are followed by web browser client 104A during startup, initialization and operation. The processes for web browser client 104A are applicable to other types of clients, as will be explained in further detail below.

When web browser client 104A begins execution:

1. Web browser client 104A downloads program instructions for generating a user interface on the display for the web browser, such as toolbar 105, shown here for implemented using Java applet 116, from web server 188. Java applet 116 also establishes persistent HTTP connection 131 between Java applet 116 and web server 188 so that web server 188 can continuously provide information to web browser client 104A.
2. Web browser client 104A interfaces with session mode communication server 110 via web engine session thread 166. Object manager 107 spawns web engine session thread 166 to interface with web browser client 104A using web engine plug-in 185 and web engine 115.

Communication client service 160 provides all communication related to the user interface with web browser client 104A.

3. Communication client service 160 requests the object manager 107 for communication service. Communication service 113, which provides all communications not related to the user interface, is provided.
4. Communication service 113 loads configuration information such as commands, events, agent information and preferences, channel driver information and channel driver parameters.
5. Communication service 113 registers an asynchronous event receiving function with object manager 107 to be invoked when an asynchronous event is subsequently received. The asynchronous event receiving function is also referred to as a callback function. Receiving asynchronous events is described in further detail below.
6. Communication service 113 request an active connection 135A between object manager 107 and web engine plug-in 185 and an active connection 135B between communication service 113 and session mode communication server 110. Persistent HTTP connection 131, and active connections 135A and 135B enable session mode communication server 110 to continually push user interface changes to toolbar 105 using Java applet 116.
7. Session mode communication server 110 spawns a session thread such as session thread 122 in response to the connection request.
8. Session thread 122 runs communication channel manager 124.
9. Communication channel manager 124 loads ACD switch driver 120D and passes the channel driver parameters determined by communication service 113.
10. ACD switch driver 120D establishes an active connection 133 to the ACD switch 130E. A vendor implementing channel driver 120 may choose to provide a persistent connection to the communication channel 130, as for telephone connections such as active connection 133. However, a persistent connection is not required by communication API 125. In this example, activated connection B is a persistent telephone connection between the customer to the agent.

When the agent performs an activity using web browser client 104A that requires a command to be executed, such as clicking a button on toolbar 105:

1. Communication client service 160 searches the command configuration data previously loaded for the command to invoke. It also collects the data associated with that command and then passes the command and data to communication service 113.
2. Communication service 113 passes the command and data to communication channel manager 124.
3. Communication channel manager 124 then determines which of channel drivers 120 performs the command requested by the client, and passes the command and data to the channel driver 120 such as ACD switch driver 120D for execution.
4. ACD switch driver 120D issues the command to the communication channel 130. In this example, the ACD switch driver 120D issues the command to ACD switch 130E.
5. When a channel driver 120 such as ACD switch driver 120D needs to push an event (status data or an incoming event such as a customer call) to web browser client 104A:

6. ACD switch driver 120D receives the event and posts the event to communication channel manager 124.

This requires asynchronous interruption at session thread 122 for event posting.

1. Communication channel manager 124 pushes the event to communication service 113.
2. Communication service 113 receives the event and executes the registered asynchronous event receiving function.
3. The registered asynchronous event receiving function inserts the event sent from ACD switch driver 120D into an event queue stored inside object manager 107.
4. A frame manager (not shown) running in session thread 122 picks up the event from the event queue and invokes the registered asynchronous event receiving function using communication client service 160.
5. Communication client service 160 asks communication service 113 to process the event.
6. After communication service 113 has processed the event, communication client service 160 continues to communicate with Java applet 116 to control the web browser for user interface changes.

FIG. 1C shows components included in one embodiment of request mode communication server 140. Request mode communication server 140 handles the distribution of information via communication channels according to the request. An example of the operation of request mode communication server 140 is session mode communication server 110 sending a request to request mode communication server 140 to send a large number of e-mails on its behalf. This enables session mode communication server 110 to devote its resources to controlling the user interface, issuing commands, and handling events.

A request mode server thread such as server thread 142 is spawned when request mode communication server 140 begins execution. Communication manager 152 is loaded to collect data for the request. Request mode communication server 140 determines the appropriate channel driver to handle the request and directs a communication channel manager 156 to load e-mail driver 120E. Communication channel manager 156 dispatches the request and data to e-mail driver 120E, which sends the information to e-mail communication channel 130F. In the embodiment shown in FIG. 1C, e-mail driver 120E sends the e-mails via e-mail server 132 to e-mail client 134.

As another example of the operation of request mode communication server 140, object manager 107 can send one or more work items from UQ system 102 to request mode communication server 140. Similar to the previous example, a request mode server thread is spawned and communication manager 152 is loaded to collect data for the request. Request mode communication server 140 determines the appropriate channel driver to handle the request and directs a communication channel manager 156 to load an appropriate driver, such as e-mail driver 120E. Communication channel manager 156 dispatches the request and data to the driver, which sends the information to a communication channel.

FIG. 1D shows an example of one implementation of inbound communication receiver 170. One embodiment of inbound communication receiver 170 is designed to serve inbound customer support requests with no connection to or knowledge of a client. This contrasts with session mode communication server 110, which communicates with a client to provide a user interface to at least one agent. An one implementation, inbound communication receiver 170 handles customer support requests that can be held in a queue for future processing, such as fax and e-mail, whereas session mode communication server 110 handles high priority support requests that should be processed as quickly as possible, such as telephone calls, to improve customer response time. In another implementation, both inbound communication receiver 170 and session mode communication server 110 can handle high priority support requests.

Inbound communication receiver 170 uses channel drivers 120 such as e-mail/fax channel driver 120F to "listen" for particular types of customer support requests from a common source. E-mail channel driver 120F handles all e-mail messages directed to a particular e-mail address and all faxes sent to a particular fax number. To avoid overlap among agents, inbound communication receiver 170 can be configured to work with UQ system 102 to assign an agent to the inbound customer support request (e-mail 173 or fax 175) and route the customer support request to a component associated with or representing the assigned agent, such as a client.

Inbound communication receiver 170 is also configured during initialization to recognize events, such as receiving a customer support request, and to include corresponding channel driver information and background profiles to handle recognized events. Background profiles include one or more monitored media objects, such as a list of e-mail addresses, fax numbers, and web-chat end points. For example, e-mail communication channel 130G represents a background profile for info@company.com, and fax communication channel 130H represents a background profile for fax number 1-800-123-4567.

Inbound communication receiver 170 spawns a server thread such as server thread 174 to handle inbound events, such as customer support requests. This contrasts to session mode communication server 110, which spawns a session thread such as session thread 122 for each client 104 being used by an agent. Communication channel manager 177 then initializes a service such as fax service object 183A, e-mail service object 183B, or phone service object 183C with the designated background profile.

When the e-mail/fax channel driver 120F receives an incoming customer support request, e.g. new fax 175, fax channel driver 120F posts the event to communication channel manager 177. This posting interrupts the idle state of server thread 174 and causes server thread 174 to invoke communication channel manager 177 to process the event. Communication channel manager 177 determines how to respond to the event based on an event response included in an event response table, such as EVTRESP (FIG. 2a), and invokes the appropriate media service, such as fax service object 183A. If the event response also specifies notifying UQ system 102 of the event, the event is then passed to UQ system 102 via UQ business service 106. A response to the event notification is returned to inbound communication receiver 170 via UQ business service 106.

In alternative embodiments, client/server system 100 can support multiple types of clients 104 having hardware/software configurations that are different from web browser client 104A. FIG. 1E shows an alternative embodiment of client/server system 100 that supports web browser client 104A, thin client 104B, and dedicated client 104C.

Thin client 104B includes one or more client software modules that are installed and executed on the client computer system used by the agent. Thin client 104B provides minimal functionality, with the majority of the functions for thin client 104B are performed by application server 126. It is often desirable to use thin clients so that application programs can be updated once in a centralized location instead of multiple times for each thin client 104B.

Thin client 104B provides more functionality on the client side than web browser client 104A, and can, for example, perform some functions of object manager 107. Thin client 104B also controls the user interface including toolbar 105. If changes are necessary to the functions performed on the client side, a new copy of thin client 104B must be installed on each individual agent's computer system.

Dedicated client 104C includes software modules that perform a significant portion of the functions required to support an agent. Dedicated clients are sometimes referred to as "fat clients," in contrast to the "thin client" designation. If changes are necessary to the functionality provided by dedicated client 104C, a new copy of the dedicated client software modules usually must be installed on the client computer system.

Dedicated client 104C provides even greater functionality than does thin client 104B, including, for example, all functionality provided by object manager 107, web server 188, communication client service 160 (FIG. 1B), and communication service 113. Because dedicated client 104C assumes all responsibility for the user interface and toolbar 105, there is no communication between dedicated client 104c and communication server 109, web server 188, web engine plug-in 185 and web engine 115 (FIG. 1B). Dedicated client 104C does include web server 149 that is capable of interfacing with UQ system 102, and object manager 151 to communicate with channel drivers 130.

It is important to note that other types of clients having hardware and software components that are different from clients 104A, 104B, and 104C can also be integrated with client/server system 100. passed to UQ client business service 184, which sends a corresponding request to UQ requester server 186. The request is passed to UQ system 102 and a response is received via web server 188, EAI server 146, and UQ receiver server 190.

Communication API

Referring now to FIGS. 1F-1J, communication API 125 is provided in one embodiment of the present invention for channel drivers 120 to communicate with communication server 109. Note that communication server 109 is used in the following discussion of communication API 125 to represent session mode communication server 110, request mode communication receiver server 140, or inbound communication receiver 170.

As shown in FIG. 1F, an example of communication between communication server 109 and channel driver 120 using communication API 125 includes three types of objects: driver objects 189, service objects 183, and client objects 179. Driver objects 189 and service objects 183 are instantiated at the channel driver 120, however client objects 179 are instantiated at communication server 109. Communication server 109 interfaces with driver objects 189 and service objects 183, but only service objects 183 communicate with client objects 179.

Driver objects 189 maintain the instantiation of service objects 183. Any special steps for constructing and destructing service objects 183 can be implemented in driver objects 189. Multiple driver objects 189 can be included to manage different types of media. Also, a single driver object 189 can manage one type of service objects 183 or different type of service objects 183. For example, a single driver object 189 can manage phone, e-mail and fax media.

As an example of the operation of driver objects 189, when communication server 109 is starting up, the channel driver 120 data link library (DLL) is loaded. Communication server 109 calls CreateISCSDriverInstance( ) function of channel driver 120 to ask for the construction of a driver object 189.

The channel driver 120 returns the driver handle back to communication server 109. The channel driver 120 determines how driver objects 189 are created. If driver objects 189 already exist, for example, the channel driver 120 could simply pass the handle of an existing driver object 189 instead of creating a new one.

Service objects 183 provide functionality in the form of device commands to interact with the associated media type. For example, making an outbound call, or sending an outbound e-mail is implemented at service objects 183. A service object 183 is usually associated with a single type of media. For example, there can be service objects 183 for phone media and other service objects 183 for e-mail media. Communication server 109 interfaces directly with service objects 183 to invoke a device command.

After communication server 109 obtains the handle to a service object 183, communication server 109 will use the service handle directly to interact with the service object 183. Since service objects 183 are created by driver objects 189, service objects 183 can inherit some facilities from driver objects 189 and/or share some resource with driver objects 189. For example, driver objects 189 can establish and maintain the physical TCP/IP connection to a middleware server of a communication channel 130 and service objects 183 can share the connection with the driver objects 189.

After communication server 109 obtains the driver handle, communication server 109 uses a RequestService( ) function to request a service object 183 for the specified media type. The driver returns the handle of the corresponding service object 183 to communication server 109. Communication server 109 then uses this handle in an InvokeCommand( ) function directly to request the corresponding service object 183 for executing a particular type of function.

Client objects 179 are instantiated and implemented by communication server 109. The handles to client objects 179 are passed to service objects 183. Service objects 183 can utilize the client handles and invoke the function to be executed at communication server 109.

Every service object 183 will have its corresponding client object 179. Therefore, each client object 179 has knowledge of the media type that its corresponding service object 183 is using. Since service objects 183 can each be instantiated for different media from different driver DLLs, this one-to-one relationship allows a client object 179 to know the channel driver 120 and service object 183 that initiate the notification when client object 179 receive notification from service object 183.

FIG. 1G shows an example of an architecture for driver object 189 instantiated by channel driver 120. Driver object 189 creates three service objects 183A-1, 183A-2, and 183A-3 of the same media type, such as e-mail. Each service object 183A-1, 183A-2, and 183A-3 has its own dedicated client object 179A-1, 179A-2, and 179A-3, respectively.

FIG. 1H shows an alternative architecture for driver object 189 that creates three service objects 183A, 183B, and 183C for different types of media. Each service object 183A, 183B, and 183C has its own dedicated client object 179A, 179B, and 179C, respectively, for processing events with the corresponding media type. An example of this architecture is shown in FIG. 1D for inbound communication receiver 170 that includes client object 179A for handling fax media, client object 179B for handling e-mail media, and client object 179C for handling phone media. Client objects 179A, 179B, and 179C correspond to fax service object 183A, e-mail service object 183B, and phone service object 183C, respectively.

FIG. 1I shows two driver objects 189A, 189B instantiated in the channel driver 120. Each driver object 189A, 189B is designated for a different middleware server of communication channel 130 and includes resources specific to the type of middleware server. For example, driver object 189A may use a TCP/IP connection to Middleware Server A and driver object 189B may have a direct connection to Middleware Server B. The service objects 183 created under each driver object 189A, 189B are specific to the middleware server with which the driver object 189A, 189B is associated.

There are several alternatives for implementing asynchronous notification of events from middleware servers to driver objects 189 including:

1. Traditional TCP/IP socket. The driver objects 189 connect to the TCP/IP port of a middleware server. Events are sent through TCP/IP connection.
2. OLE interface. One example is the IAdviseSink interface in OLE.
3. Any other inter-process communication scheme.

With alternative 1, since the driver objects 189 are implemented as a DLL, the driver object DLL either constructs a listening thread which blocks on select( ) call until the arrival of an event, or a polling thread which periodically polls the middleware server for the arrival of event. Polling threads are useful for low-priority media type, e.g. e-mail or fax, because polling periods typically last seconds or minutes. Polling threads are not as useful to detect high-priority media events, such as phone requests, because it is desirable to report the arrival of an incoming call at any time. Listening threads generate less network traffic than polling threads, and are generally useful for high priority and low priority media, however, some types of middleware servers do not support listening threads.

To implement both polling threads and listening threads, a "task" thread is required in the driver object DLL. The "task" thread can be executed in driver objects 189 as shown in FIG. 1J or in service objects 183 as shown in FIG. 1K.

Referring to FIG. 1J, a task thread (or listen thread) implemented the driver objects 189 may be "shared" by all service objects 183. For example, this listen thread can listen for all incoming events for all service objects 183. Once the listen thread receives an event, the listen thread then invokes and executes the event handling function implemented at service objects 183.

Referring to FIG. 1K, if the listen thread is implemented at the domain of service objects 183, every service object 183 constructs its own listen thread and the listen thread is not shared. Each listen thread is listens to a different target. For example, listen thread for user 1 listens for events on the first phone extension (ext.

1234), while the listen thread for user 1 listens for events on the second phone extension (ext. 5678).

Client objects 179 are a collection of function pointers implemented by Communication server 109 and passed to the service objects 183 for asynchronous event notification. In one implementation, when the listen thread in channel driver 120 receives an event, the following processes occur:

1. Service object 183 calls HandleEvent( ). HandleEvent implemented in corresponding client object 179 is executed.
2. Client object 179 queues this event to a memory cache.
3. Client object 179 interrupts or signals the server thread 174 (FIG. 1D) for Communication channel manager 177 to indicate the arrival of an event. Once this process is completed, the listen thread waits for the next event.

4. During the next cycle of server thread 174, main thread sees an event is available in the memory cache. It dequeues the event out of the memory cache and continues the processing.

Communication API Commands

Communication API 125 includes commands and data structures to allow third parties to develop applications that can integrate with client/server system 100. The data structures include arrays for passing data elements such as an agent's key value element, key value parameters, and string parameter lists.

The following provide examples of runtime status flags that can be used in communication API 125:

| | |
|---|---|
| NOTSUPPORTED = 1; | Command is not supported |
| DISABLED = 2; | Command is disabled at this time |
| CHECKED = 4; | Command is in "checked" state, for example when agent is in busy mode the "busy" command will be "checked" |
| BLINKING = 8; | This is special effect flag to enable the blinking "answer call" command |
| NOPARAMSOK = 16; | Command does not require any parameters to execute |
| STRPARAMSOK = 32; | Command can be executed by providing single unnamed string parameters. Such commands are invoked when the agent types something in the edit control of the communication toolbar 105 and clicks the corresponding button. |

The following provide examples of commands that can be used in one embodiment of communication API 125:

The MediaType command is used from channel driver 120 to provide the media type. The media-type-string is passed to the channel driver 120 at CreateISCDriverInstance( ).
  PHONECONTROL=1
  CALLROUTING=2
  EMAIL=3
  FAX=4
  WEBCALL=5
  WEBCHAT=6

Channel driver 120 uses the CommandTypeEx function to request different services, such as making calls and sending messages, from communication server 109.

The SCObjectype function is used to monitor the communication objects, which can be represented by the following parameter values:
  OB_LINK=1
  SWITCH=2
  QUEUE=3
  TELESET=4
  DN=5
  AGENT=6
  CALL=7
  CALLROUT=8
  EMAIL=9
  FAX=10
  WEBCALL=11
  WEBCHAT=12
  OTHERS=1000

The function ObjectProperty can be used to provide properties of monitored communication objects, such as:
  OP_ONOFF=1
  OP_AGENTID=2
  OP_NOTREADY=4
  OP_BUSY=5
  OP_DESCRIPTION=7
  OP_TIMEINQUEUE=9
  OP_QUEUEID=12
  OP_ISLOGON=13

Channel Driver Functions

In one embodiment, a driver objects 189 within each of channel drivers 120 include the following functions:

FreeSCStrParamList is invoked by communications server 109 to release the memory which is initially allocated by channel drivers 120.

RequestMediaTypeList is invoked by communications server 109 to query the list of media type strings supported by channel drivers 120. It can include the parameter mediaTypeList, which is a list of media-type strings.

RequestCommandEventList is invoked by communications server 109 to query the list of device commands and device events supported by the channel drivers 120.

FreeSCStrParamList( ) is invoked by communication server 109 to release memory.

RequestCommandEventList is invoked to generate lists of commands and events that are implemented for a particular media type. The parameters can include an input parameter specifying the media type, and output parameters that include lists of the commands and events.

CreateISCDriverInstance is invoked to create a channel driver 120. The following parameters can be used:
  mediaTypeStr: the media-string that is defined by a particular driver implementation.
  languageCode: the language string, e.g. "ENU" for English, "FRA" for French, "DEU" for German, "PTB" for Portuguese-Brazilian, "ESN" for Spanish, "ITA" for Italian, and "JPN" for Japanese.
  connectString: the connect string for the channel driver 120
  datasetParams: the parameter list collected from the configuration
  handle: the handle to channel driver 120 returned by the channel driver 120

RequestService requests media functions from the channel driver 120. The following parameters can be used:
  clntInterface: the interface at the client side
  connectString: the connect string for the service objects
  datasetParams: the parameter list collected based on the configuration
  serviceHandle: the handle to the service objects returned by the driver ReleaseISCDriverInstance is invoked by communication server 109 to release the driver instance specified by the driver handle supplied as a parameter.

Service Object Functions

In one embodiment, service objects 183 within each of channel drivers 120 can include the following functions:

ReleaseISCServiceInstance is invoked to release the service object's handle.

NotifyEventHandlingFinished is invoked by communications server 109 to notify the channel driver 120 that the event handling is complete and the channel driver 120 can move on or continue the process. This function is invoked to respond to HandleEvent's notifyWhenDone parameter. The following parameter list can be used:
  Handle: identifier of the service object
  trackingID: an identifier for the work item for which the communications server 109 was doing event handling.
  result: the result of event handling query of the list of media type strings supported by the channel driver 120.

InvokeCommand is invoked by communications server 109 to invoke a driver command. The following parameter list can be used:

Handle: identifier of the service object clntCmdTrackID: the unique ID for the InvokeCommand request name: the command name to invoke stringParam: the string from "Phone #" edit box on the toolbar 105 datasetParam: the parameter list collected based on the configuration

InvokeCommandEx is invoked by communications server 109 to invoke a certain type of command. The following parameter list can be used:

Handle: identifier of the service object clntCmdTrackID: the unique ID decided by the communications server 109 for this InvokeCommand request commandType: the type of command the communications server 109 wants to execute datasetParam: the predefined parameter list set by the communications server ReleaseWorkItem is invoked by communication server 109 to request release of a work item. Parameters can include:

Handle: identifier of the service object

TrackingID: identifier of the work item.

SuspendWorkItem is invoked by communication server 109 to request the service object to suspend a work item. Parameters can include:

Handle: identifier of the service object

TrackingID: identifier of the work item.

ResumeWorkItem is invoked by communication server 109 to request the service object to resume a work item. Parameters can include:

Handle: identifier of the service object

TrackingID: identifier of the work item.

HandleQueuedEvent is invoked by communication server 109 to pass an event previously queued in UQ system 102 to the service object for handling. The channel driver 120 can treat this as an incoming media event from the middleware server. Parameters can include:

Handle: identifier of the service object name: the event name (from the original HandleEvent( ) call)

fields: the event attributes list (from the original HandleEvent( ) call)

trackingID: the unique ID for the media item

CancelQueuedEvent is invoked by communication server 109 to notify the channel driver 120 that a media-event is cancelled, released, or transferred by UQ system 102. This function is the companion function of HandleQueuedEvent( ). The following parameters can be used:

Handle: identifier of the service object name: the event name (from the original HandleEvent( ) call)

trackingID: the unique ID for the media item

Client Object Functions

The following are examples of functions that can be included in Client Objects 179. The interface to these functions can be implemented with a function pointer so that driver objects 189 do not need to link to any libraries in communication server 109.

RequestService( ) issues a request from client objects 179 to driver objects 189. The CLIENT_INTERFACE object and the CLIENT_HANDLE are passed as parameters.

ReleaseClientInstance causes driver object 189 to release a client object's handle.

BeginBatch and Endbatch are designed to saving network overhead. The ISC_CLIENT_INTERFACE function calls between BeginBatch and EndBatch will be cached and sent out at EndBatch call. These two functions can be used at the discretion of the driver object 189. This is the example usage,

```
BeginBatch_Helper(clientInterface);
        CacheCommandInformation_Helper(clientInterface, ...);
        <-- cached
    ; ; ; ;// some processing
    if (error)
        HandleError_Helper(clientInterface, ...); <-- cached
    HandleEvent_Helper(clientInterface, ...); <-- cached
    EndBatch_Helper(clientInterface); <-- All requests will be sent
out in one request
*/
```

HandleEvent is used to handle the named event received from the driver, using the given fields. By calling this method, the driver notifies the client objects 179 of the event, such as a call coming in on the monitored teleset. The following is the parameter list:

Handle: identifier of the service object name: the event name fields: event attributes list notifyWhenDone: When set to TRUE, Client objects 179 will use notifyEventHandlingFinished( ) to notify the driver as soon as the event handling is done.

trackingID: the ID uniquely identifies the work item that this event is associated with, e.g. call ID, e-mail ID or web-chat session ID. The length of trackingID should not exceed MAX_TRACKING_ID_LEN.

ShowStatusText displays textual status information in the status line of the client objects 179. The following is the parameter list:

Handle: identifier of the service object text: the text to display at the client status bar HandleError handles asynchronous errors and logs them to an error log file. The following parameters can be used:

Handle: identifier of the service object clntCmdTrackID: if not 0, it is the same "clntCmdTrackID" value passed to InvokeCommand( ) to reflect the error caused by the request in InvokeCommand( ). If it is 0, the error occurs out of context.

error: the error text.

CacheCommandInformation is used to notify the client objects 179 about command status caching. The following parameters can be used:

commandNames: list of command names commandDescriptions: list of description text for each command commandStatuses: list of status(SCCommandFlag) for each command UpdateObjectInformation is used to notify the client objects 179 about status change of objects. The following parameters can be used:

trackingID: the ID uniquely identify the call that causes this information update objectType: enum of SCObjectType objectID: the unique ID for this object. For phone, it is the extension. For e-mail, it is the mailbox. For fax, it is the fax number.

datasetInfo: the list of SCObjectProperty value to update. For example, {{"4", "TRUE"}, {"7", "33"}}(SC_OP_ISNOTREADY is TRUE and SC_OP_TIMEINQUEUE is 33 seconds) where the first key of "3" is SC_OP_ISTALKING and the value is "TRUE". The second key of "6" is SC_OP_TALKINGSINCE and the value if "03/12 . . . . "

IndicateNewWorkItem notifies client objects 179 about the arrival of new inbound work item(e.g. call, e-mail or fax). The following parameters can be used:

trackingID: the unique ID to identify this work item oldTrackingID: if the driver or the middleware supports a facility to change the work item's ID. Use this oldTrackingID to identify the old ID. This is to tell client objects 179, "Here is the new work item, but it originated from the old work item".

WorkItemStarted notifies client objects 179 that the agent has started working on one particular work item. This happens when (1) the agent answers a call and the call is connected, or (2) the agent accepts a e-mail/fax work item. In response, client objects 179 set the work item identified by "trackingID" as the active work item and start tracking this work item. The agent will be treated as talking or working. The start time of this work item will be recorded by client objects 179. The following parameters can be used:

trackingID: the unique ID to identify this work item oldTrackingID: See the comment of IndicateNewWorkItem( )

objectType: the object type objectID: the media object for this work item. For phone, it is the extension. For e-mail, it is the mail box.

description: the description of work item which will be displayed at the top of combo box. Driver implementation can use UpdateObjectInformation to change the description of work item.

startTime: the time the work item is started

WorkItemReleased is used to notify client objects 179 that a particular work item is released. This happens when (1) the agent releases a call and the call is disconnected, or (2) the agent completes an e-mail/fax work item. In response, client objects 179 stop tracking this work item and remove this work item. The following parameters can be used:

trackingID: the unique ID to identify the work item that is being released.

stopTime: the time the work item is released/stopped.

CleanAllWorkItems notifies client objects 179 that all work items stored in client objects 179 should be removed.

WorkItemSuspended notifies client objects 179 that a work item is suspended. This happens when (1) the agent puts a call to hold, or (2) the agent suspends an e-mail/fax work item. The driver implementation calls this function when suspension is done. In response, client objects 179 save the working context for this particular work item. The following parameter can be used:

trackingID: the unique ID to identify the work item

WorkItemResumed notifies client objects 179 that a suspended work item is resumed. This happens when (1) the agent unholds a call and the call is retrieved, or (2) the agent resumes an e-mail/fax work item. The driver objects 189 call this function when restoring is complete. In response, client objects 179 restore the working context(screen+work-tracking obj) and set the active work item as the one identified by "trackingID". The following parameters can be used:

trackingID: the unique ID to identify the work item

Note that other functions and parameters can be included in communication API 125 instead of, or in addition to, the functions listed herein.

Universal Queuing System

UQ system 102 queues requests for all types of media until an agent is assigned to the request. As agents become available (either by an agent logging in, finishing a task, or due to a change in state or assignment), UQ system 102 pushes a work item from a communication channel to an agent, and removes the work item from the respective queue. In one implementation, when multiple work items are routed to an agent, the work item that arrived first is presented to the agent and the other work item is returned to its respective queue and rerouted/pushed to the next available agent that is capable of handling the particular work item.

UQ system 102 includes UQ receiver 302 and UQ requester 304 that interface with UQ engine 306 via UQ server 308. An enterprise application integration (EAI) server 146 can be included in system 100 to receive messages from UQ system 102. In one embodiment, web server 188 receives the message and sends it to EAI server 146. EAI server 146 packages the messages using a suitable protocol, such as simplified object access protocol (SOAP), and transmits it to UQ receiver server 190. In other embodiments that do not include EAI server 146, the message can be sent directly to UQ receiver server 190 using a suitable message format and transport protocol.

UQ Configuration

FIGS. 1A-E and 3 illustrate the manner in which a client 104 chooses a UQ configuration via the UQOpenConnection function in UQ business service 310. UQ system 102 uses information such as "UQ receiver server name" and "UQ receiver Port" to determine where to send responses. In one embodiment, multiple UQ receiver servers 190 can be connected to UQ system 102, and, therefore, each receiver communicating with UQ system 102 sends a UQ configuration parameter in the UQOpenConnection function. Tables in patent application Ser. No. 09/823,590 entitled "System and Method for Multi-Channel Communication Queuing," as previously incorporated by reference herein, provide examples of parameters in a UQ configuration table stored in UQ system 102 and used to establish communication with and perform functions as requested by communication server 109.

UQ Business Service

UQ system 102 interfaces with UQ requester server 186 and web server 188 via UQ business service 310. UQ business service 310 places information received from UQ system 102 into appropriate data structures used by SRM API 114. UQ business service 310 places information in SRM API 114 data structures into commands and parameters recognized and used by UQ system 102.

In one embodiment, UQ business service 310 includes the following functions, with input and output parameters shown in parentheses, for initializing and communicating with the UQ system 102:

UQOpenConnection (UQConfigurationName, Return)

Provides UQ business service 310 with the necessary UQ configuration parameters to receive messages from communication server 109. The parameter "Return" in all of the UQ business service functions indicates status of the function upon return, for example, "0" means execution was successful.

UQAssign (Return)

Provides the UQ business service 310 with the necessary UQ configuration parameters to communicate with the communication server 109 via UQ receiver server 190 and UQ requester server 186.

UQInitRules(Return)

When UQOpenConnection is called, UQ business service 310 determines whether to upload rules, such as agent rules, and work item escalation rules. This function is called during the start-up of communication server 109. If the rules are to be sent, this function retrieves route rules and escalation rules from a data table and packages them for transmission to UQ system 102. Once rules are downloaded to UQ system 102, the UQReplaceRules function is called to modify the rules.

UQReplaceRules(Return)
  This function is called when the UQ rules need to be updated, such as when changes are made to a set of agent or escalation rules while communication server 109 is in operation.

UQ Disconnect (Return)
  Commands UQ system 102 to terminate the connection between UQ system 102 and web server 188, and between UQ system 102 and UQ requester server 186. This function is called when UQ system 102 services are no longer needed.

In one embodiment, UQ business service 310 also includes the following functions for initializing and maintaining agents:

AgentLogon (AgentLogin, Return, AgentState)
  This function allows an agent to log into UQ system 102. Once the login is successful, agent is ready to receive work items. The AgentLogin parameter is the agent identification number assigned in communication server 109. The AgentState parameter is set to a value indicating the agent's state after the function is executed.

AgentLogout (AgentLogin, Return, AgentState)
  This function allows an agent to log out of UQ system 102. Once the logout is successful, UQ system 102 will not queue any more work items for this agent.

AgentInitAuxwork(AgentLogin, Output)
  This function requests UQ system 102 to place the agent in AuxWork mode after all the current work items are completed. In AuxWork mode, agent will not receive more work but will remain logged in to the UQ system 102.

AgentAvailable(AgentLogin, Return, AgentState)
  This function requests UQ system 102 to place the agent into available status. In the available state, the agent is ready to receive work items.

RequestAgentMediaMode (AgentLogin, MediaType, Return, AgentMediaMode)
  This function allows clients 104 to request the agent state.

ChangeAgentMediaMode (AgentLogic,Return,AgentMediaMode)
  This function allows clients 104 to change the media mode for an agent.

ChangeAgentSkil (AgentLogin,Return)
  This function allows clients 104 to update the skill of an agent. After an agent's skill has been changed, this function should then be used to update UQ system 102 with the new agent skill.

RequestAgentState (AgentLogin,Return, AgentState)
  To request UQ system 102 to report the current agent state.

RequestAgentWorkItemList (AgentLogin, Return, WorkItemID, MediaType, IsScheduledTask, ScheduleStartTime, ScheduleEndTime, AgentID, WorkItemState, WorkItemDataProperty)
  Request the UQ system 102 to return a list of all work items currently being handled by an agent.

RequestAgentWorkableList (AgentLogin, Return, WorkItemID, MediaType, IsScheduledTask, ScheduleStartTime, ScheduleEndTime, AgentID, WorkItemState, WorkItemDataProperty)
  This function requests UQ system 102 to return a list of possible work items for the agent. This function is used when the agent wants to pick a particular work item rather than being assigned to work items by UQ system 102.

RequestWorkItemAssignment (AgentLogin, WorkItemID, Return)
  This function requests UQ system 102 to dispatch the specific work item to the agent if possible. If the work item is still available, the Return parameter code indicates SUCCESS and the work item will be delivered through communication server 109.

RequestAgentMediaState (AgentLogin, Return, MediaType, AgentState, NumWorkItems)
  This function requests UQ system 102 to report the media (channel state) for each media that the agent is capable of handling.

In one embodiment, UQ business service 310 also includes the following functions for initializing and maintaining work items:

AddWorkItem (WorkItemID, MediaType, IsScheduledTask, ScheduleStartTime, ScheduleEndTiem, WorkItemDataProperty, Return)
  This function requests UQ system 102 to add the specific work item into the UQ system 102 for future dispatch.

RequestWorkItemState (WorkItemID, Return, WorkItemState)
  This function requests the current state of a work item.

AcceptWorkItem (WorkItemID, Return)
  This function allows clients 104 to tell UQ system 102 that the assigned work item has been accepted. As a result, agent state and work item state are updated by UQ system 102 to reflect the acceptance of the work item.

RejectWorkItem (WorkItemID, AgentLogin, Reason, Return)
  This function allows clients 104 to tell UQ system 102 that the assigned work item has been rejected. As a result, the work item will be sent back to the queue and the agent state for the channel will be set to AuxWork.

CompleteWorkItem (AgentLogin, WorkItemID, Return)
  This function informs UQ system 102 that the work item is completed. The next state for the agent will depend on the Auto-Wrap setting, which can be set via a user interface such as toolbar 105. If Auto-Wrap is True, the agent is in Wrap mode and the work item will be in wrap mode. If Auto-Wrap is FALSE, the agent is placed back in the Available state.

HoldWorkItem (AgentLogin, WorkItemID, Return, WorkItemState, NewAgentState).
  This function requests UQ system 102 to put a work item on hold status.

UnHoldWorkItem (AgentLogin, WorkItemID, Return, WorkItemState, NewAgentState).
  This function requests UQ system 102 to take a work item off hold status.

BlindTransferWorkItemToAgent (AgentLogin, WorkItemID, Return)
  This function transfers a work item to another agent. If the agent is not available, the work item can be queued for the agent.

TransferWorkItemToAgent (AgentLogin, WorkItemID, Return)
  This function tells UQ system 102 to transfer the work item to the agent. If the agent is not available, UQ system 102 can inform the requesting agent that the work item is not deliverable.
TransferWorkItemToRoute (AgentLogin, RouteID, Return)
  This function transfers an agent to a route defined in the system 100 (FIG. 1). A route represents a specific way to process the work item. Transferring a work item to a route redefines the characteristics of the work item and the way the work item should be handled. For example, the work item was first believed to be best handled by agents with NT knowledge and now find that it should be handled by a AIX agent. Therefore, this work item is transferred to a route that will handle AIX.

In one embodiment, UQ business service 310 includes the following functions for reporting performance statistics:
SetChannelStatInterval (Interval,Return)
  This function is used to set the feeding interval of the channel real time statistics. A predetermined default, such as 60 seconds, can be used. Statistics are transmitted to UQ business service 310 and logged into a table.
StartAgentStat (Interval,Return)
  This function is used to initiate the transmission of agent statistics. Data is logged to an agent statistics table.
StopAgentStat (AgentLogin,Return)
  This function is used to stop the transmission of agent statistics.

In one embodiment, UQ business service 310 includes the following functions for handling work items:
HandleWorkItem (AgentLogin, WorkItemID, MediaType, IsScheduleTask, ScheduleStartTime, ScheduleEndTime, AgentLogin, WorkItemState, DataProperty, MediaType, IsScheduleTask, ScheduleStartTime, ScheduleEndTime, AgentLogin, WorkItemState, DataProperty, Return)
  This function is used to inform a client that a work item is being assigned to an agent.
HandleWorkItemStatus (WorkItemID, MediaType, IsScheduleTask, ScheduleStartTime, ScheduleEndTime, AgentLogin, WorkItemState, DataProperty, Return)
  This function is used to inform clients 104 that the status for the work item has been changed, so clients 104 can take any action that is necessary as a result. For example, work item status could be changed from alerting to complete because the other party abandoned the work item. In this case, clients 104 may have some housekeeping to perform.
HandleAgentStateChange (AgentLogin, AgentState, Return)
  This function is used to inform UQ client that the state of the agent has been changed.
HandleRouteStatisticsRequest (RouteStat, TotalWorkItems, AverageWaitTime, AverageServeTime, NlongestWaitTiem, OperationMode, Return)
  This function is used to inform clients 104 of the arrival of route statistics information. This method will handle the incoming statistics information, for example, by writing it to a database.
HandleAgentStatisticsRequest (AgentLogin, TotalWorkItems, AverageServeTime, AverageWrapTime, TotalAuxTime, TotalServingTime, TotalLoginTime, TotalServedWorkItem, Return)
  This function is used to inform the UQ client of the arrival of agent statistics information. This method will handle the incoming statistics information. Very likely the information will be written to a database.
HandleError (MessageCode, Return)
  This function is used to inform UQ client that an error is received.
HandleAlarm (MessageCode, Return)
  This function is used to inform UQ client that an alarm is received.
HandleJournal (WorkItemID, WorkItemDataProperty, AgentStateHist, AgentLogin, AgentState, StartTime, EndTime, UQReasonCode, AgentReasonCode, EscHist, SzStep, StartTime, EndTime, UQReasonCode, AgentReasonCode, Return)
  Journal of a work item to be sent to UQ client when the work item is completed. UQ client will log the journal into database.

The foregoing lists are examples of functions that can be included in UQ business service 310. Other functions can be included in addition to, or instead of, these examples. Some of the functions include return codes and/or state codes to indicate whether a requested function was performed successfully and/or the state of UQ system 102, a work item, or an agent. The following lists provide examples of codes that are used as parameters in the preceding functions:

| | Return Code |
|---|---|
| 0 | Success |
| 1 | Success_More_Status |
| 2 | Error_Uq_Initialized |
| 3 | Error_Uq_Not_Initialized |
| 4 | Error_Failed |
| 5 | Error_System_Wrong_Api |
| 6 | Error_System_Initialization_Failed |
| 7 | Error_Agent_Setting_Invalid_State |
| 8 | Error_Agent_Undefined |
| 9 | Error_Agent_Unable_To_Change_Skill |
| 10 | Error_Queue_Not_Initialized |
| 11 | Error_Queue_Undefined |
| 12 | Error_Queue_Capacity_Exceeded |
| 13 | Error_Workitem_Adding_Failed |
| 14 | Error_Workitem_Failed_Change_State |
| 15 | Error_Unknown_Media |

| | Agent State |
|---|---|
| 1 | Available |
| 2 | Logout |
| 3 | Busy |
| 4 | AuxWork |
| 5 | InitAuxWork |

| | Media Mode |
|---|---|
| 1 | Available |
| 2 | Unavailable |
| 3 | Busy |
| 4 | Wrap_Up |

| Operation Reason Code | |
|---|---|
| 1 | Setting_Invalid_State |
| 2 | Agent_Not_Available |
| 3 | Route_Undefined |

| Work Item State | |
|---|---|
| 1 | Active |
| 2 | Wrap_Up |
| 3 | Alerting |
| 4 | Completed |
| 5 | Queued |
| 6 | Scheduled |
| 7 | On_Hold |
| 8 | Received |

UQ driver 312 handles packing and unpacking information using appropriate data transfer protocols for outgoing and incoming messages. In one implementation, for example, HTTP is used to communicate messages to and from UQ system 102. Web server 188 converts information in HTTP format to another suitable transport protocol which UQ driver 312 unpacks for use by UQ business service 310 in UQ receiver server 190. In other embodiments, other protocols known in the art can be used instead of, or in addition to, HTTP.

In one embodiment, UQ business service 310 includes functions and entry points as described herein that are invoked to initialize and communicate with UQ system 102 regarding the state of an agent, the skills of an agent, state of a work item, errors, alarms, and responses to a request. For example, during initialization, the function UQOpenConnection is invoked to inform UQ system 102 about the presence of each client.

When UQOpenConnection is invoked, UQ business service 310 determines whether rules need to be uploaded to UQ system 102. If so, UQ business service 310 invokes UQRulesInit to provide UQ system 102 with a list of rule definitions for generating a route rules list and an escalation rules list. After successfully downloading the rules, UQ system 102 is ready to accept requests.

When a client does not need service from UQ system 102, the function UQDisconnect can be invoked to disconnect clients 104 from UQ system 102. However, UQ system 102 can continue operation to serve other clients.

UQ Routing

UQ engine 306 defines a route for processing each work item. For example, if a work item is a fax requiring response from an agent with knowledge of computer networking, the UQ engine 306 would define a route that specifies an agent with computer networking skills. An agent can transfer the work item to a route queue using the functions TransferWorkItemToRoute(Route configuration Name) or BlindTransferWorkItemToAgent(agentID) if the agent is not able to respond to the work item. The skill requirements for the work item can be changed before invoking the transfer if the agent determines that a different skill is necessary to respond to the work item. In one embodiment, route points are generated, wherein each route point has specific skill requirements. When a work item is to be transferred to another point, the transferring agent can choose a route point from a pop up list, for example. The list can include the option to either list all agents or all route points.

UQ API

In one embodiment, a system 100 (FIG. 1) in accordance with the present invention includes an application programmer's interface (UQ API) 314 for UQ system 102. For example, the interface can translate information in one format, such as simplified object access protocol (SOAP) used by UQ business service 310 (FIG. 3) to an extensible markup language (XML) format used in UQ system 102. UQ API 314 can also translate information between other formats suitable for use in business service 310 and UQ system 102. Alternatively, the same format can be used throughout system 100, thereby eliminating the need for UQ API 314.

In one embodiment, a user interface for entering and editing agent skills is provided. An example of an agent skill graphical user interface (GUI) is described in U.S. patent application Ser. No. 09/823,531, entitled "User Interface for Multi-Channel Communication", which application was filed on the same day and is assigned to the same assignee as the present application and is incorporated by reference herein. The agent skill GUI includes fields for selecting, entering and editing agent information including name, employee number, job title, login name, contact information, skills, and the level of expertise for each skill item. After a client updates the skills of an agent through the agent skill GUI, the ChangeAgentSkill function in UQ business service 310 can be used to update agent information in UQ system 102.

UQ API Data Structures

Tables representing data structures that are used in one embodiment of UQ API 314 for communicating information between UQ system 102 and communication server 109 are provided in patent application Ser. No. 09/823,590 entitled "System and Method for Multi-Channel Communication Queuing," as previously incorporated by reference herein.

Example Interface for CS/UQ Communications

A more specific example of an inter-module interface according to embodiments of the present invention is now defined. As previously noted, no library or DLL is needed before a UQ driver using the interface can be developed. In the same manner as a regular DLL, however, the interface defines a collection of export functions. These export functions are the entry points for applications to either request a service (send a command) or data (send a request or a notification) from another module. An implementation overview is now provided.

The first step is the configuration of UQ. Certain basic information is required in order for CS to communicate with UQ. The requisite information includes UQ server name and UQ listening port. This information is in a UQ configuration table, such as that previously described. There is also information about the preference for this UQ operation. An example of such preferences is whether an agent should be auto-ready after login or auto-auxwork after login. Such information will be in the CS configuration table for each agent. Therefore, the behavior of each configuration can be different. Those pieces of information are be name value pair information, fundamentally. Such information is described in greater detail in patent application Ser. No. 09/823,590 entitled "System and Method for Multi-Channel Communication Queuing," as previously incorporated by reference herein.

The following is a general example of using an HTTP POST or GET message in a system such as that described herein:
URL=<HTTPLoginURLTemplate>

A more specific example is:
URL=http:sourceURL
SWEExtSource=uq&SWEExtCmd=ExecuteLogin&UserName=wpak&Password=db2

The following is an example of using HTTP POST to make a request:
URL=<HTTPURLTemplate>
HTTP Body=XML Document A more specific example including an actual XML document is as follows:

```
URL = http://<webserver>/<path>/start.swe
HTTP Body = <SOAP-ENV:Envelope xmlns:SOAP-
ENV="http://soapserver.com/uq/envelope" SOAP-
ENV:encodingStyle="http://soapserver.com/uq/encoding">
    <SOAP-ENV:Body>
        <HandleAgentStateChange>
            <AgentID>Bond007</AgentID>
            <NewAgentState>3</NewAgentState>
        </HandlAgentStateChange>
    </SOAP-ENV:Body>
</SOAP-ENV:Envelope>
```

The following is an example of using an HTTP GET to log out:
URL=http://<webserver>/<path>/
start.swe?SWEExtCmd=Logoff When a UQ client starts, the UQ client first uses UQOpenConnection( ) to open a connection to UQ. This is not necessarily a one-to-one connection, but rather a mechanism to inform UQ that one more client desires to use the facilities provided by UQ. There is typically only one connection from CS to UQ. CS sends requests via UQ business service to US via an HTTP connection, as described elsewhere herein.

Using the UQOpenConnection, a UQ client chooses which UQ configuration to use. UQ business service packages the message together along with information needed by UQ. Then the UQ business service sends the message to UQ. Information needed by UQ includes "UQ receiver server name" and "UQ receiver Port". UQ uses these two pieces of information to determine where the asynchronous response will be sent. Therefore, if there is a need to support multiple receivers, several UQ configurations can be employed. For UQ clients that are not agents, such UQ clients choose their UQ configuration or use the default. For agent, each CS configuration contains the parameter "UQ Configuration-Name". It is this configuration that is passed to UQ business service.

In each UQ configuration, there are primary receiver parameters, including parameters such as HTTPLogin-BodyTemplate, HTTPLoginURLTemplate and HTTPLogoutURLTemplate, general examples of which are given subsequently. The primary receiver is the receiver to which UQ will send the events and responses. For each request that requires an asynchronous response, there is a ConnectionID parameter. This ConnectionID is the "Receiver Name" and "Receiver Port". In this manner, UQ determines where the response should be sent.

Each UQ client uses UQOpenConnection to inform UQ about the client's presence. This UQOpenConnection( ) also contains information about the existence of a receiver on the CS side. After a successful initialization, UQ should be ready, but will typically not be operational. UQ then receives UQRulesInit( ). This call passes a list of rules definition to UQ. Based on the information thus received, UQ is able to build the route rules list and escalation rules list. After this call, UQ is ready to accept request. It should be noted that there should only be one such call from CS to UQ. Although multiple UQRulesInit( ) does not cause errors, such multiple calls are a waste of system resources. For subsequent UQRulesInit( ) calls, the call returns SUQ_ERROR_U-Q_INITIALIZED as the error code. Because subsequent UQRulesInit( ) calls will wrap out all existing rules, UQReplaceRules should be used after the initial rules download. After a successful rules download, UQ is ready to provide services using the inter-module messages described herein.

When a UQ client has completed the requisite processing, and the UQ client does not currently need further interaction with UQ, the UQ client calls UQDisconnect( ) to disconnect itself from UQ. UQ will, of course, continue to execute so as to maintain its ability to serve other UQ clients. If UQ fails to detect further connections, UQ can assume that the UQ service is no longer needed. UQ continues to be operational and awaits new connection requests at that point, however.

There are several method entry points in the CS/UQ interface. Those entry points allow UQ to inform CS about state of an agent, state of a work item, errors, alarms, response(s) to a request and the like. Some of the method calls are for CS to request service from UQ. Some of those methods are asynchronous. Therefore, the result may be available immediately. The UQ interface specifies whether a call is synchronous or asynchronous. Asynchronous function calls use a request ID, among other such parameters. The purpose of the request ID is to allow the UQ client to track the response. It is important that UQ should return the same request ID in responding to the request. It will be noted that some responses can be made via specific call-back functions and some responses can be made via HandleMessage( ).

The parameters for this function are as follows.
ISCS_CLIENT_HANDLE handle

This is the handle of the UQ client. This UQ client initializes the function pointers in ISUQ_CLIENT_INTERFACE to provide an entry point for UQ to CS.
const SUQ_MESSAGE_TYPE nMessageType There are three different message types:
SUQ_MESSAGE_ALARM: for reporting alarm
SUQ_MESSAGE_ERROR: for reporting error
SUQ_MESSAGE_REQUEST_RESPOSE: for reporting response to a request The response indicates either that the request is successfully executed, or the request failed and the error code is in the nMessageCode.
const int nMessageCode One of the error codes defined in the header file. Refer to the error code section for more information on the error code
const int nRequestID The same request ID when a request is issued by UQ client.
const ISCS_ParamList* pParams Addition parameters that would provide more information about the message. Refer to the error code section for more information.
HandleMessage( ) is:

| | |
|---|---|
| handle | same client handle as in ISUQ_CLIENT_INTERFACE |
| nMessageType | SUQ_MESSAGE_REQUEST_RESPONSE |
| nMessageCode | SUQ_ERROR_FAILED |
| nRequestID | the same request ID as that of the request |
| pParams | pParams should be empty for a successful invocation |

Parameters are different for each error. A list of parameters is shown in Table 1.

TABLE 1

List of parameters for various errors.

| | |
|---|---|
| SUQ_ERROR_FAILED | vendor specific error code |
| SUQ_ERROR_SYSTEM_WRONG_API | major version supported, minor version supported |
| SUQ_ERROR_AGENT_SETTING_INVALID_STATE | current state, state to be set |
| SUQ_ERROR_AGENT_UNDEFINED | agent ID |
| SUQ_ERROR_AGENT_UNABLE_TO_CHANGE_SKILL | agent ID, Skill, Skill Item, . . . |
| SUQ_ERROR_QUEUE_CAPACITY_EXCEEDED | queue ID, current capacity |
| SUQ_ERROR_WORKITEM_FAILED_CHANGE_STATE | current state, state to be set |
| SUQ_SUCCESS_MORE_STATUS | vendor specific status code |
| SUQ_ERROR_QUEUE_UNDEFINED | queue ID |

It is sometimes necessary for UQ to inform the condition of the system as a result of some situation. For example, UQ may need to inform UQ client about certain queue exceeding its maximum capacity. This and similar situations are reported through HandleMessage( ) with the proper message type. This message received by the UQ receiver. UQ receiver then dispatches the message to UQ business service. This business service deals with handling the messages. The most common reactions are expected: log the error and report the condition to the appropriate party. Reporting can be done through the message bar. Logging in such situations is written to the database.

If the secondary receiver does not exist, errors and alarms are reported to the primary receiver, otherwise they are reported to the secondary receiver. Three different kinds of messages are reported through HandleMessage( ): response to a request, alarm and error. Response to a request is the condition after executing a request. An alarm is a condition in which the UQ client needs to know of, but does not affect the general operation of UQ. For example, of the number of work item in a route exceeds the pre-configured limit an error condition occurs. An error is condition that will affect the operation of the system. For example, an error condition exists if the UQ server is low on memory and therefore cannot accept more requests. All three kinds of conditions can be reported through HandleMessage using different in parameters in Table 2.

TABLE 2

List of conditions reported through HandleMessage.

| Parameter | Response to a request | Alarm | Error |
|---|---|---|---|
| Handle | Client handle | Client handle | Client handle |
| SUQ_MESSAGE_TYPE | SUQ_MESSAGE_REQUEST_RESPONSE | SUQ_MESSAGE_ALARM | SUQ_MESSAGE_ERROR |
| nRequestID | Same request ID when request is submitted | NA | NA |

There are several objects in the system in which state information is important. Such information is passed between UQ and CS so that the state of the object will be synchronized. For example, when UQ sets an agent state to wrap, a message will be sent to CS about the change. Table 3 describes the information sent from CS to UQ and from UQ to CS in various scenarios.

TABLE 3

List of scenarios for CS/UQ exchanges.

| Scenario | CS Responsibility | UQ Responsibility |
|---|---|---|
| Logon | Use AgentLogon( ) to log the agent to UQ | Synchronously respond to CS whether the logon is successful or not. Also report the current state of the agent |
| Logout | Use AgentLogout( ) to log the agent out of UQ | Synchronously respond to CS whether the logoff is successful or not. Also report the current state of the agent |
| Initiate Auxwork | Use AgentInitAuxWork( ) to initiate aux work. Typically, agent is still working on work item. Initiating aux work will inform UQ to put the agent into auxwork mode when all the work items are completed. | Synchronously respond to CS that the request has been accepted. When the agent is finally being set to AuxWork mode, the changes will be reported through HandleAgentStateChange( ). |

TABLE 3-continued

List of scenarios for CS/UQ exchanges.

| Scenario | CS Responsibility | UQ Responsibility |
| --- | --- | --- |
| Request for Available | Use AgentAvailable( ) to request to put the agent into available state | Synchronously respond to CS whether the request is successful or not. Also report the current state of the agent. |
| Wrap-up/Complete/ Complete Wrap a work item | Use WrapUpWorkItem( )/ CompleteWorkItem/CompleteWrap WorkItem to inform UQ that agent is trying to wrap up or complete or finishing wrap up for the work item. | Synchronously respond to CS whether the request is successful or not. Also report the new agent state and new work item state as a result of this request. |

UQ System Scenarios

Examples are now provided showing the manner in which requests from clients are processed by one embodiment of system 100.

Initialization and Rules Download

Communication server background mode server 170 uses UQOpenConnection function in UQ business service 310 to connect clients with UQ system 102. In one embodiment, two or more configurations can be available to initialize UQ business service 310, including a default configuration. The default UQ configuration parameters are used if no other configuration specified. The UQPropertyInfo parameters of UQOpenConnection included PrimaryReceiverName and PrimaryReceiverPort which identify the location of the UQ receiver server 190.

UQOpenConnection can be invoked multiple times to connect multiple UQ receiver servers 190 to UQ system 102, and UQ system 102 maintains a list of all connections to UQ receiver servers 190. After a successful UQOpenConnection, the function UQInitRules can be invoked to download agent skill information, as well as rules for escalating agents and specifying routes. In one embodiment, UQInitRules is invoked only once during initialization, and the function UQReplaceRules is used to update the rules once they have been initialized. The parameter ERROR_UQ_INITIALIZED indicates an error if UQInitRules if subsequently invoked. An indicator of whether the initialization was successful is supplied in the Return parameter associated with the UQInitRules function.

Agent Logon

New agents invoke UQOpenConnection through business service 310 to inform UQ system 102 that there is a new agent. The function AgentLogon is then invoked by UQ business service 310 to log the agent into UQ system 102. UQ business service 310 then sends a message that includes the agent skill information to UQ system 102.

If multiple UQ receiver servers 190 are connected, each invocation of the function AgentLogon includes information about the UQ receiver server 190 that the agent is associated with. Agent information also includes information including auto-available setting and auto-wrap setting. UQ system 102 returns either the error if the invocation to AgentLogon fails, or returns the new agent state if the logon operation was successful.

Email Arrival

When communication server 109 receives an e-mail message, it sends the message along with related information regarding the client who sent the message to business service 310 in UQ requester server 186. Business service 310 transfers the e-mail message and related information to UQ system 102 via the AddWorkItem function. UQ system 102 determines whether to accept the work item and issues a response to communication server 109 via business service 310 in UQ receiver server 190 indicating whether the work item was accepted using the status parameter in the HandleWorkItem function.

UQ Delivers Work Item

UQ system 102 determines an agent for a work item and sends a message that the work item was assigned to an agent to communication server 109 via the UQ receiver server 190 associated with the agent. UQ system 102 then transmits a message via the HandleWorkItem function to the UQ receiver server 190 associated with the agent. The ProcessEvents function in UQ business service 310 is then invoked to dispatch the message to an agent via SRM API 114. The agent invokes the WorkItemAccept function to inform UQ system 102 that it received the work item.

UQ System Issues an Alarm or Error

As an example of one method for UQ system 102 to notify communication server 109 of an error or alarm, assume UQ system 102 determines that the number of requests that can be handled by one of the communication channels has exceeded a predefined threshold. UQ system 102 sends a return code to UQ receiver server 190 via the HandleError function indicating that the queue capacity has been exceeded. If an EAI server 146 is included in the particular embodiment of the invention, the EAI server 146 receives the message and invokes the function "ProcessEvents" in UQ business service 310. The error message can be logged and broadcast to the component that issued the request. Alarm messages are handled in a similar manner. The error/alarm can be broadcast visually, aurally, textually, and/or by any other suitable means known in the art.

UQ System Sends Statistics to Communication Server

A client or other component in system 100 (FIG. 1) can request statistics regarding its communication channels, agents, and/or the routing of agents, from UQ system 102 via SetChannelStatInterval, StartAgentStat, and StopAgentStat functions. UQ system 102 generates the requested statistics and transmits them to UQ receiver 190. When UQ receiver 190 receives the message, it can log the statistics and broadcast them through an interface such as a message bar mechanism, as known in the art. Agent configurations can be set up to request statistics on a continual basis. The statistics can include information for work items completed as well as work items in the agent's queue.

Agent Accepts a Work Item

When an agent is in AuxWork mode, the agent can choose a work item from the queue through a user interface such as the toolbar 105. When a work item is selected, UQ system 102 is notified via the RequestWorkableItemList function in business service 310. If the work item is available, the function will indicate a successful selection through the return parameter and the work item is delivered via the HandleWorkItem function. The RequestWorkableItemList function can return an error indicator if the work item is not available for the agent.

Call Routing

When UQ system 102 receives a route request, UQ system 102 determines the agent to assign to the work item and sends a message to UQ receiver server 190 that includes the assigned agent and the work item. If UQ system 102 cannot find an agent to assign within the time allowed, the request is placed in a waiting queue as implemented by UQ engine 306. It is important to note that many different types of commercially available queuing engines 306 can be used in UQ system 102.

Automated Call Distribution (ACD) Interaction With The UQ System

Referring to FIGS. 1A-E and 3, an agent can be connected to receive calls directly from ACD switch 130E, without interacting with UQ system 102. Agents can also be connected to receive calls from ACD switch 130E as well as other work items through UQ system 102. This type of configuration is referred to auxiliary work mode (AuxWork mode). An agent can place themselves in the AuxWork state through an interface such as toolbar 105, or an administrator may configure the agent to enter the AuxWork state.

In one implementation of AuxWork mode, ACD switch 130E dispatches a call to an agent, and the agent informs session mode communication server 110 when it answers the call. Session mode communication server 110 then relays the notice to UQ system 102. At this point, UQ system 102 asks session mode communication server 110 to place the agent in the AuxWork state using, for example, the AgentInitAuxwork function as described herein, after the agent finishes the call.

When the agent finishes the call, it informs session mode communication server 110 that the call is done, and the session mode communication server 110 in turn informs UQ system 102 that the call is finished. UQ system 102 then determines whether there is a suitable work item to assign to the agent based on the media channels in the agent's configuration. If a work item is available, the work item will be sent to the agent through UQ receiver server 190 via UQ requester 304. The agent informs UQ system 102 when it finishes the work item. If UQ system 102 determines that there are no more work items for the agent, it informs session mode communication server 110 to set the agent's ACD mode to ready to continue receiving calls through ACD switch 130E.

There are several alternative implementations that can be used to place an agent in the AuxWork state. For example, an agent can default to AuxWork state. UQ system 102 can be notified when ACD switch 130E receives a call that should be handled by the agent, and the agent notified to suspend processing a work item, such as a response to an e-mail request, to take the call. The agent notifies UQ system 102 when the call is completed, and returns to processing the suspended work item.

Agent State Change

When a work item is dispatched to an agent, the agent invokes the AcceptWorkItem function to accept the work item. Output parameters in AcceptWorkItem inform UQ system 102 of the new agent state and work item state. When the agent completes the work item, it invokes the CompleteWorkItem function to inform UQ system 102 of the new agent state and work item state.

An auto-wrap option can be set in the agent's configuration table that allows an agent time to wrap up a work item upon completion. Agents can select an interface option that invokes the AgentAvailable function to indicate that they are out of wrap up mode and ready to accept another work item. UQ system 102 changes the status of the work item to Complete and places the agent in the Auxwork state if AgentInitAuxWork function has been invoked. If the AgentInitAuxWork function is not invoked, the agent's state is set to BUSY if there are other work items in the queue that the agent can handle. Otherwise the agent is placed in the Available state.

Work Item Cancelled

A situation can arise when a work item is cancelled after it has been assigned to an agent, but before the agent has accepted the work item. Such a situation may arise, for example, when a caller hangs up while waiting. In this case, the UQ system 102 informs the client that the work item is cancelled through HandleWorkItemStatus and a signal, such as a blinking button on the agent's user interface display, can be changed to indicate that the work item was removed.

PBX And Email with PBX Higher Priority

The term private branch exchange (PBX) refers to a subscriber-owned telecommunications exchange that usually includes access to the public switched network. When an e-mail and a PBX work item are queued, UQ system 102 uses the priority set forth in the route rules to determine which media will have higher priority over the other. Client configurations typically give PBX work items higher priority than e-mail.

Work Item Journal

When a work item is completed, UQ system 102 sends a work item journal entry to communication server 109 via the HandleJournal function. The journal entry includes information to identify whether the journal entry pertains to the agent state history and/or the work item escalation history of the work item.

System Failure

If the connection between UQ system 102 and session mode communication server 110 fails, UQ system 102 will remove all agents associated with session mode communication server 110 and mark all work items as "Complete" with a failure error code.

Multiple Requesters and Receivers

When UQ business service 310 is instantiated, it will load the UQ configuration including the sender's server component name and the workflow name. In one embodiment, the sender server component is the EAI server 146, which is transparent to clients 104. If there are multiple instances of EAI server 146, communication server 109 routes the request to the appropriate component in communication server 109. A load balancer can be included to balance the load between multiple instances of EAI server 146.

Each work item sent by UQ clients include a login and a client key associated with the work item. When the same work item is being returned form UQ system 102 as a result of either an agent assignment or problem with the work item, the login and the client key are used to route the result to the right client.

Blind Transfer of a Work Item to an Agent

An agent can use the function BlindTransferWorkItemTo-Agent to transfer a work item to another agent if the agent cannot respond to the work item, or thinks that another agent is better qualified to respond. If the transferred agent is not available to accept the work item being transferred, the work item will be queued until the agent is available.

Consultative Transfer of a Work Item to an Agent

An agent can invoke the TransferWorkItemToAgent function to transfer a work item to another agent to consult with the other agent regarding the work item. If the agent is not available for consultation, UQ system 102 informs the agent that the other agent is not available. The agent can select whether to hold on to the work item, retry, or send the work item to a route.

Transfer Work Item to a Route

An agent can use the function TransferWorkItemToRoute to transfer a work item to along a route to another agent. This is useful, for example, when an agent receives a work item that would be handled more efficiently by an agent with other skills.

Example Data Models

Figure 4:
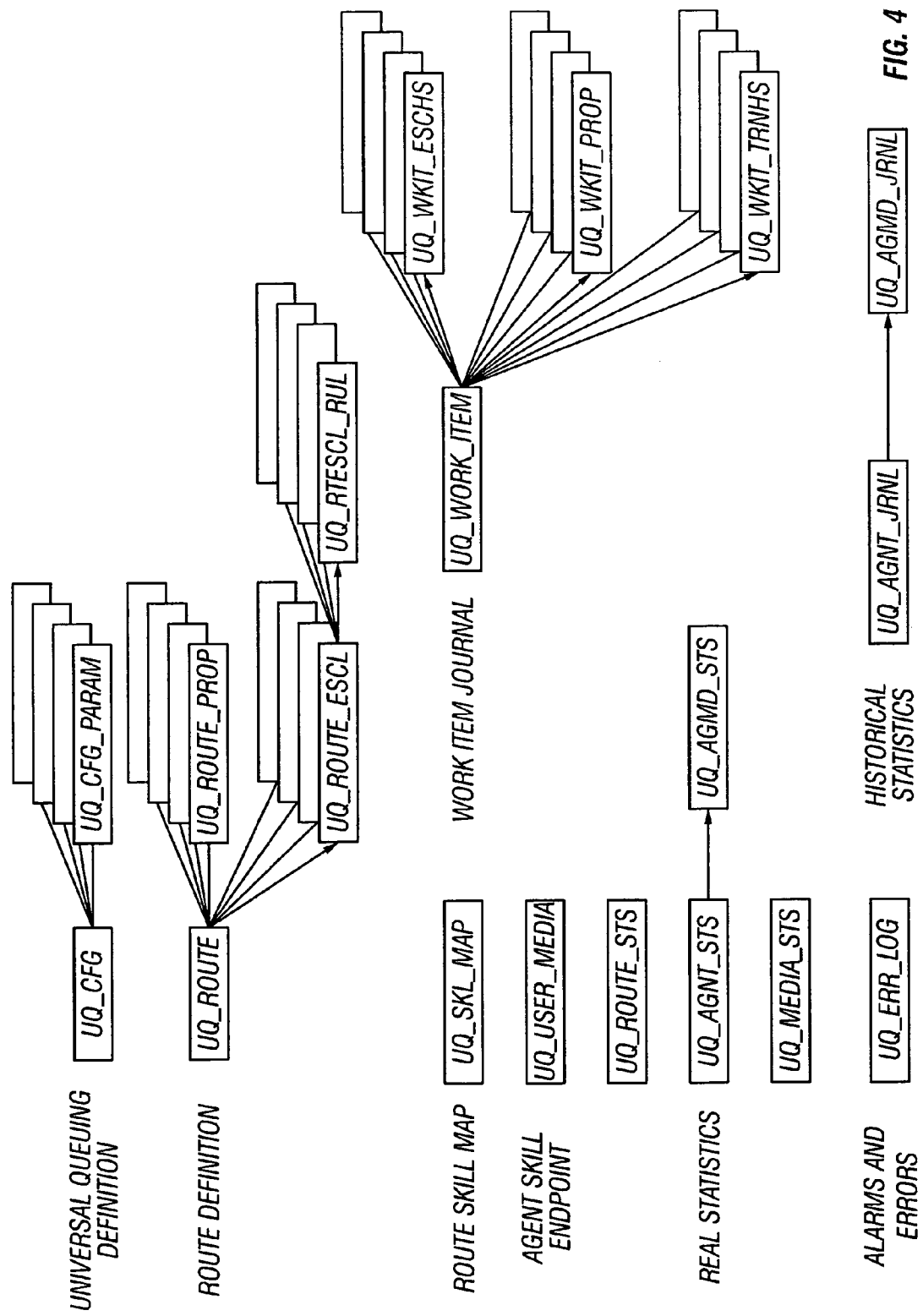
FIG. 4 is a block diagram illustrating example data models for various functions within the system of FIGS. 1A through 1D.
Figure 5:
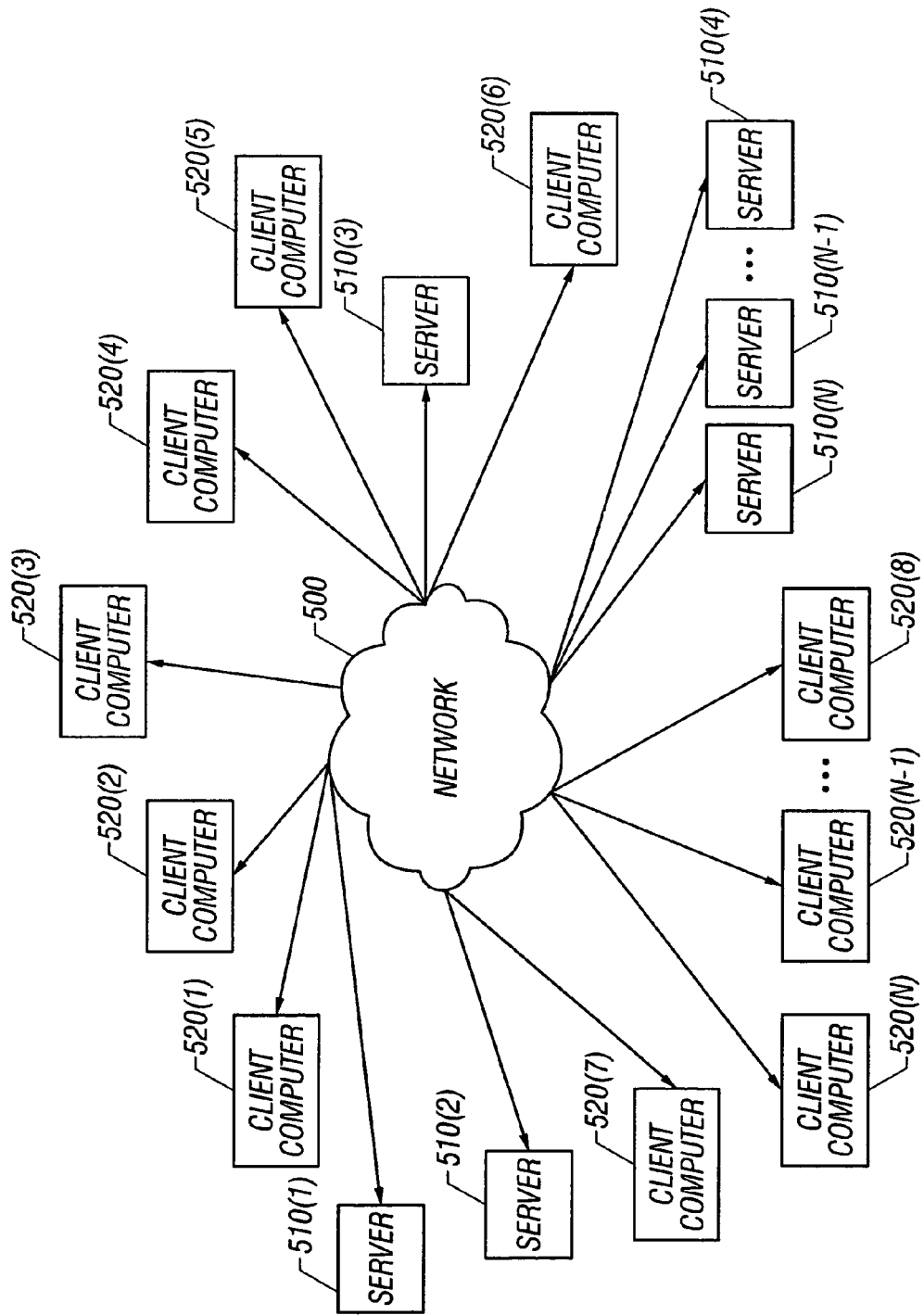
FIG. 5 is a block diagram illustrating a network environment in which commercial transaction processing according to embodiments of the present invention may be practiced.

FIG. 4 is a block diagram illustrating example data models for various functions within system 100. More detailed descriptions of the following tables (including example field definitions) can be found in patent application Ser. No. 09/823,590 entitled "System and Method for Multi-Channel Communication Queuing," as previously incorporated by reference herein. The following is provided to generally describe the data model used in supporting the interface described herein. It will be noted that, in FIG. 4, multiple boxes are used to indicate a one-to-many relationship.

Tables representing data in the Universal Queuing definition include tables designated UQ_CFG and UQ_CFG_PARAM. Table UQ_CFG defines configuration parameters for UQ system 102, such as the UQ server name, server port, receiver name, receiver port and the like. Table UQ_CFG_PARAM includes configuration parameters for UQ system 102 such as the configuration identifier and the name of the configuration.

Tables representing data in the Route definition include tables designated UQ_ROUTE, UQ_ROUTE_PROP, UQ_ROUTE_ESCL and UQ_RTESCL_RUL. Table UQ_ROUTE allows a user to define different routes for different media types, priorities and other characteristics. Table UQ_ROUTE_PROP further defines the data properties of a route. The characteristic of a route can be defined by one or more route properties. Table UQ_ROUTE_ESCL defines how the processing of a work item can be escalated because the work item has not been served for a pre-defined period of time. Each escalation process defines a way that a work item should be processed. In general, the escalation process is to generalize the skill requirement of a work item so that the chance of having the work item served is improved. Table UQ_RTESCL_RUL defines the skill requirement for each escalation rule. Each rule generalizes the skill requirement of a work item.

The table representing data in the Route Skill Map is designated UQ_SKL_MAP. Table UQ_SKL_MAP is a map between route properties and skills. For example, "DNIS"="8000" could be translated into "Product"="NT". This is basically a list of possible properties for each media. For example, e-mail has subject, CC, recipient. PBX has ANI and Language.

The table representing data in Agent Skill End Point is designated UQ_USER_MEDIA. Table UQ_USER_MEDIA represents the number of end points, also referred to as maximum number of sessions, for each media type that an agent is allowed.

Tables representing data in the Real Statistics include tables designated UQ_ROUTE_STS, UQ_AGNT_STS, UQ_MEDIA_STS and UQ_AGMD_STS. These tables store route, agent, media and agent media statistics information, respectively. In one embodiment, the statistics are sent from UQ system 102 to communication server 109 at pre-defined time intervals as specified in the UQ configuration passed to UQ system 102. An agent or administrator can also request statistics when desired through communication server 109. Some of the statistics, such as "Average Wait Time" are time dependent, and therefore, the time period is also included as part of the data.

The table representing data regarding alarms and errors is designated UQ_ERR_LOG. As its name suggests, table UQ_ERR_LOG stores information regarding alarms (an alarm log) and errors (an error log).

Tables representing data in the Work Item Journal include tables designated UQ_WORK_ITEM, UQ_WKIT_ESCHS, UQ_WKIT_PROP and UQ_WKIT_TRNHS. These tables contain historical information regarding the processing history of each work item, escalation history of a work item, properties of a work item and transaction history of a work item, respectively Tables representing data regarding historical statistics include tables designated UQ_AGENT_JRNL and UQ_AGMD_JRNL. These tables contain historical information regarding the processing history of each work item, escalation history of a work item, properties of a work item and transaction history of a work item, respectively UQ Interface An example of an inter-module interface definition is given in the Appendix, as noted previously. This interface defines, as its basic unit, a message. A message communicates information regarding an agent, a work item, queuing, statistics, connections, rules and other information regarding a customer relations management system such as system 100.

As has been noted, a message can be, for example, a command (a directive that is to cause the recipient to do something), a request (in response to which the recipient replies with requested information) or a notification (notifying the recipient of some event or autonomously providing information of some sort). Commands defined in the example interface definition in the Appendix include:

1. AgentLogin (AgentLoginResponse)
2. AgentLogout (AgentLogoutResponse)
3. AgentInitAuxWork (AgentInitAuxWorkResponse)
4. AgentAllMediaAvailable (AgentAllMediaAvailableResponse)
5. ChangeAgentMediaMode (ChangeAgentMediaModeResponse)
6. ChangeAgentSkill (ChangeAgentSkillResponse)
7. AddWorkItem (AddWorkItemResponse)
8. AcceptWorkItem (AcceptWorkItemResponse)
9. WrapCompleteWorkItem (WrapCompleteWorkItemResponse)
10. HoldWorkItem (HoldWorkItemResponse)
11. UnHoldWorkItem (UnHoldWorkItemResponse)
12. BlindTransferWorkItemToAgent (BlindTransferWorkItemToAgentResponse)
13. TransferWorkItemToAgent (TransferWorkItemToAgentResponse)
14. TransferWorkItemToRoute
15. SetChannelStatInterval (SetChannelStatIntervalResponse)
16. SetRouteStatInterval (SetRouteStatIntervalResponse)
17. StartAgentStat (StartAgentStatResponse)

18. StopAgentStat (StopAgentStatResponse)
19. UQOpenConnection (UQOpenConnectionResponse)
20. UQReopenConnection (UQReopenConnectionResponse)
21. UQInitRules (UQInitRulesResponse)
22. UQReplaceRules (UQReplaceRulesResponse)
23. UQDisconnect (UQDisconnectResponse)

Requests defined in the example interface definition in the Appendix include:
1. RequestWorkItemStatus (RequestWorkItemStatusResponse)
2. RequestAgentState (RequestAgentStateResponse)
3. RequestAgentMediaMode (RequestAgentMediaModeResponse)
4. RequestSystemState (RequestSystemStateResponse)
5. RequestAgentWorkableList (RequestAgentWorkableListResponse)
6. RequestWorkItemAssignment (RequestWorkItemAssignmentResponse)
7. RequestAgentWorkItemList (RequestAgentWorkItemListResponse)
8. RequestAgentMediaState (RequestAgentMediaStateResponse)
9. GetSystemStatistics (GetSystemStatisticsResponse)

Notifications defined in the example interface definition in the Appendix include:
1. HandleError
2. HandleAlarm Messages are also classified as to the functions to which they relate. Defined in the Appendix are agent-related functions, work item-related functions, statistics-related functions and administrative functions (or, more specifically in the example interface definition startup/shutdown-related functions). These can be divided as follows. Examples of agent-related functions (command/request and response) provided in the example inter-module interface definition in the Appendix are as follows:
1. AgentLogin (AgentLoginResponse)
2. AgentLogout (AgentLogoutResponse)
3. AgentInitAuxWork (AgentInitAuxWorkResponse)
4. AgentAllMediaAvailable (AgentAllMediaAvailableResponse)
5. ChangeAgentMediaMode (ChangeAgentMediaModeResponse)
6. ChangeAgentSkill (ChangeAgentSkillResponse)
7. RequestAgentState (RequestAgentStateResponse)
8. RequestAgentMediaMode (RequestAgentMediaModeResponse)
9. RequestSystemState (RequestSystemStateResponse)
10. RequestAgentWorkableList (RequestAgentWorkableListResponse)
11. RequestWorkItemAssignment (RequestWorkItemAssignmentResponse)
12. RequestAgentWorkItemList (RequestAgentWorkItemListResponse)
13. RequestAgentMediaState (RequestAgentMediaStateResponse)

Examples of work item-related functions (command, as well as the response, where appropriate) provided in the example inter-module interface definition in the Appendix are as follows:
1. AddWorkItem (AddWorkItemResponse)
2. RequestWorkItemStatus (RequestWorkItemStatusResponse)
3. AcceptWorkItem (AcceptWorkItemResponse)
4. RejectWorkItem
5. CompleteWorkItem
6. WrapUpWorkItemResponse
7. WrapCompleteWorkItem (WrapCompleteWorkItemResponse)
8. HoldWorkItem (HoldWorkItemResponse)
9. UnHoldWorkItem (UnHoldWorkItemResponse)
10. BlindTransferWorkItemToAgent (BlindTransferWorkItemToAgentResponse)
11. TransferWorkItemToAgent (TransferWorkItemToAgentResponse)
12. TransferWorkItemToRoute Examples of statistics-related functions (request and response) provided in the example inter-module interface definition in the Appendix are as follows:
1. SetChannelStatInterval (SetChannelStatIntervalResponse)
2. SetRouteStatInterval (SetRouteStatIntervalResponse)
3. StartAgentStat (StartAgentStatResponse)
4. StopAgentStat (StopAgentStatResponse)
5. GetSystemStatistics (GetSystemStatisticsResponse)

Examples of administrative functions (command and response) provided in the example inter-module interface definition in the Appendix are as follows:
1. UQopenConnection (UQopenConnectionResponse)
2. UQReopenConnection (UQReopenConnectionResponse)
3. UQInitRules (UQInitRulesResponse)
4. UQReplaceRules (UQReplaceRulesResponse)
5. UQDisconnect (UQDisconnectResponse)

Certain of the messages define one-way communications, while others define two-way communications. Examples of one-way communications include those messages that allow a module to autonomously provide another module with information (e.g., an alarm). Further examples of one-way communications provided in the example inter-module interface definition in the Appendix include:
3. HandleWorkItem
4. HandleWorkItemStatus
5. HandleAgentStateChange
6. HandleSystemStatisticsRequest
7. HandleRouteStatisticsRequest
8. HandleAgentStatisticsRequest
9. HandleMediaStatisticsRequest
10. HandleError
11. HandleAlarm
12. HandleAgentJournal
13. HandleJournal Examples of two-way communications are the command/response pairs defined therein. Further examples of two-way communications provided in the example inter-module interface definition in the Appendix include:
1. AgentLogin (AgentLoginResponse)
2. AgentLogout (AgentLogoutResponse)
3. AgentInitAuxWork (AgentInitAuxWorkResponse)
4. AgentAllMediaAvailable (AgentAllMediaAvailableResponse)
5. ChangeAgentMediaMode (ChangeAgentMediaModeResponse)
6. ChangeAgentSkill (ChangeAgentSkillResponse)
7. RequestAgentState (RequestAgentStateResponse)
8. RequestAgentMediaMode (RequestAgentMediaModeResponse)
9. RequestSystemState (RequestSystemStateResponse)

10. RequestAgentWorkableList (RequestAgentWorkableListResponse)
11. RequestWorkItemAssignment (RequestWorkItemAssignmentResponse)
12. RequestAgentWorkItemList (RequestAgentWorkItemListResponse)
13. RequestAgentMediaState (RequestAgentMediaStateResponse)
14. AddWorkItem (AddWorkItemResponse)
15. RequestWorkItemStatus (RequestWorkItemStatusResponse)
16. AcceptWorkItem (AcceptWorkItemResponse)
17. WrapCompleteWorkItem (WrapCompleteWorkItemResponse)
18. HoldWorkItem (HoldWorkItemResponse)
19. UnHoldWorkItem (UnHoldWorkItemResponse)
20. BlindTransferWorkItemToAgent (BlindTransferWorkItemToAgentResponse)
21. TransferWorkItemToAgent (TransferWorkItemToAgentResponse)
22. SetChannelStatInterval (SetChannelStatIntervalResponse)
23. SetRouteStatInterval (SetRouteStatIntervalResponse)
24. StartAgentStat (StartAgentStatResponse)
25. StopAgentStat (StopAgentStatResponse)
26. GetSystemStatistics (GetSystemStatisticsResponse)
27. UQOpenConnection (UQOpenConnectionResponse)
28. UQReopenConnection (UQReopenConnectionResponse)
29. UQInitRules (UQInitRulesResponse)
30. UQReplaceRules (UQReplaceRulesResponse)
31. UQDisconnect (UQDisconnectResponse)

Such commands need to be supported within each module, of course, so that the command (and attendant information, if any) can be handled appropriately. This includes providing data structures that support the inter-module interface. Two sets of such data structures that support the example inter-module interface definition in the Appendix are now discussed, those for an agent skill interface and an assignment rule interface.

UQ Interface for Agent Skill

In UQ API, two function calls are defined. This function is used for reporting the change of agent state from CS to UQ. The first function can be coded as follows:

```
IUQAPI ISCS_ERROR ChangeAgentState
    (ISCS_SERVICE_HANDLE    handle,
     const int               nRequestID,
     const ISCS_STRING       szAgentID,
     const SUQAgentState     nAgentState)
```

This function is used to report the change of agent skill from CS to UQ. Again, agent skill is one of the elements in the parameter. The second function can be coded as follows:

```
IUQAPI ISCS_ERROR ChangeAgentSkill
    (ISCS_SERVICE_HANDLE        handle,
     const int                   nRequestID,
     const ISCS_STRING           szAgentID,
     const SUQ_AgentSkillList*   pAgentSkill);
```

Agent Skill is defined as follows:

```
/*
    UQ Skill items
    szSkillItem
    name of the skill item (e.g., "English" for Language skill)
    nWeight
    numeric representative of expertise.
*/
typedef struct UQ_SkillItem
{
    char                szSkillItem[SUQ_SKILL_ITEM_LEN];
    SUQSkillExpertise   nWeight;
} SUQ_SkillItem;
/*
    UQ Skill item with range
    nSkillItemType
    data type of the skill item
    szSkillItemLow
    low range of the skill item
    szSkillItemHigh
    high range of the skill item
    nWeight
    numeric representative of expertise.
*/
typedef struct UQ_SkillItemRange
{
    SUQSkillItemType    nSkillItemType;
    char                szSkillItemLow[SUQ_SKILL_ITEM_LEN];
    char                szSkillItemHigh[SUQ_SKILL_ITEM_LEN];
    SUQSkillExpertise   nWeight;
} SUQ_SkillItemRange;
/*
    SUQ_SkillUnion
    Skill item could be a single value skill or could be a
range of skill value
*/
typedef struct UQ_SkillUnion
```

```
{
    union
    {
        SUQ_SkillItemRange*    pSkillItemRange;
        SUQ_SkillItem*         pSkillItem;
    };
} SUQ_SkillUnion;
/*
UQ Agent Skill
This structure defines the skill that an agent has
processed.
*/
typedef struct UQ_AgentSkill
{
    char                szSkill[SUQ_SKILL_LEN];
    int                 nSkillItemCount;
    SUQ_SkillUnion*     pSkillUnion;
} SUQ_AgentSkill;
/*
UQ Agent Skill List
This structure defines the agent skill set. An agent could
process more than one skill.
*/
typedef struct UQ_AgentSkillList
{
    int                 nSkillCount;
    SUQ_AgentSkill*     pSkill;
} SUQ_AgentSkillList;
/*
UQ agent end point limit
define number of max sessions allowed for each media type
*/
typedef struct UQ_AgentMedia
{
    char                szMedia[SUQ_MEDIA_TYPE_LEN];
    int                 nNumberOfSessions;
} SUQ_AgentMedia;
/*
UQ Agent End point List
Define number of max sessions allowed for each media type
*/
typedef struct UQ_AgentMediaLimit
{
    int                 nMediaCount;
    SUQ_AgentMedia*     pAgentMedia;
} SUQ_AgentMediaLimit;
/*
UQ Agent Skill and media definition
define the agent skill set and the active sessions
limitation on each channel
*/
typedef struct UQ_AgentDefinition
{
    SUQ_AgentMediaLimit*    pAgentMedia;
    SUQ_AgentSkillList*     pAgentSkill;
} SUQ_AgentDefintion;
```

UQ Interface for Route Definition

The following defines the route and escalation rules. This structure will be passed to UQ as part of the UQInitRoute( )

```
/*
Escalation Skill
*/
typedef struct UQ_EscSkill
{
    char                szSkill[SUQ_SKILL_LEN];
    char                szSkillItem[SUQ_SKILL_ITEM_LEN];
} SUQ_EscSkill;
/*
Escalation Skill List
*/
typedef struct UQ_EscSkillList
{
    int                 nSkillCount;
    SUQ_EscSkill*       pEscSkill;
} SUQ_EscSkillList;
/*
Escalation Rules
*/
typedef struct UQ_EscalationRule
{
    char    szEscalationName[SUQ_ESCALATION_NAME_LEN];
    SUQ_EscSkillList*   pSkillList;
} SUQ_EscalationRule;
/*
Route Escalation Rule List
*/
typedef struct UQ_EscalationRuleList
```

```
-continued

{
    int                     nItemCount;
    SUQ_EscalationRule*     pItem;
} SUQ_EscalationRuleList;
/*
    UQ Route Rules
    This is the UQ Route Rule definition.
*/
typedef struct UQ_RouteRules
{
    ISCS_UNIQUE_ID
szRuleID[SUQ_UNIQUE_ID_LEN];
    ISCS_STRING
szRuleName[SUQ_ROUTE_NAME_LEN];
    int                     nPriority;
    ISCS_STRING             szMediaType;
    int                     nCapThreshold;
    bool                    bActive;
    SUQ_EscalationRuleList* pEscalationRules;
} SUQ_RouteRules;
```

Initially, UQ receives UQOpenConnection( ) informing UQ that UQ client is starting. Once connection is successful, UQInitRules( ) will be called to transfer rules information to UQ. An example of a message using an inter-module interface according to the present invention that is an XML data representation of a routing rule appears below.

```
<RouteDef>
<RuleID>1234</RuleID>
<RuleName>Test Route</RuleName>
<Priority>1</Priority>
<MediaType>Email</MediaType>
<CapThreshold>200</CapThreshold>
<ServiceLevel>120</ServiceLevel>
<Active>true</Active>
<EscalationRules arrayType="arrayElement[1]" >
    <arrayElement>
        <EscalationName>Escalation Rule One</EscalationName>
        <SkillList arrayElement="arrayElement[1]">
            <arrayElement>
                <Skill>Language</Skill>
                <SkillItem>Eng</SkillItem>
            </arrayElement>
        </SkillList>
    </arrayElement>
</EscalationRules>
</RouteDef>
```

It is appreciated that operations discussed herein may consist of (or be initiated by) directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the actions described herein may be executed by a module (e.g., a software module) or a portion of a module or a computer system user using, for example, a computer system such as the storage router previously mentioned, or a similar network element, as well as a computer system such as computer system 1110. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, etc. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein. An example of such a computer system is computer system 710 of FIG. 7.

An Example Computing and Network Environment

Figure 6:
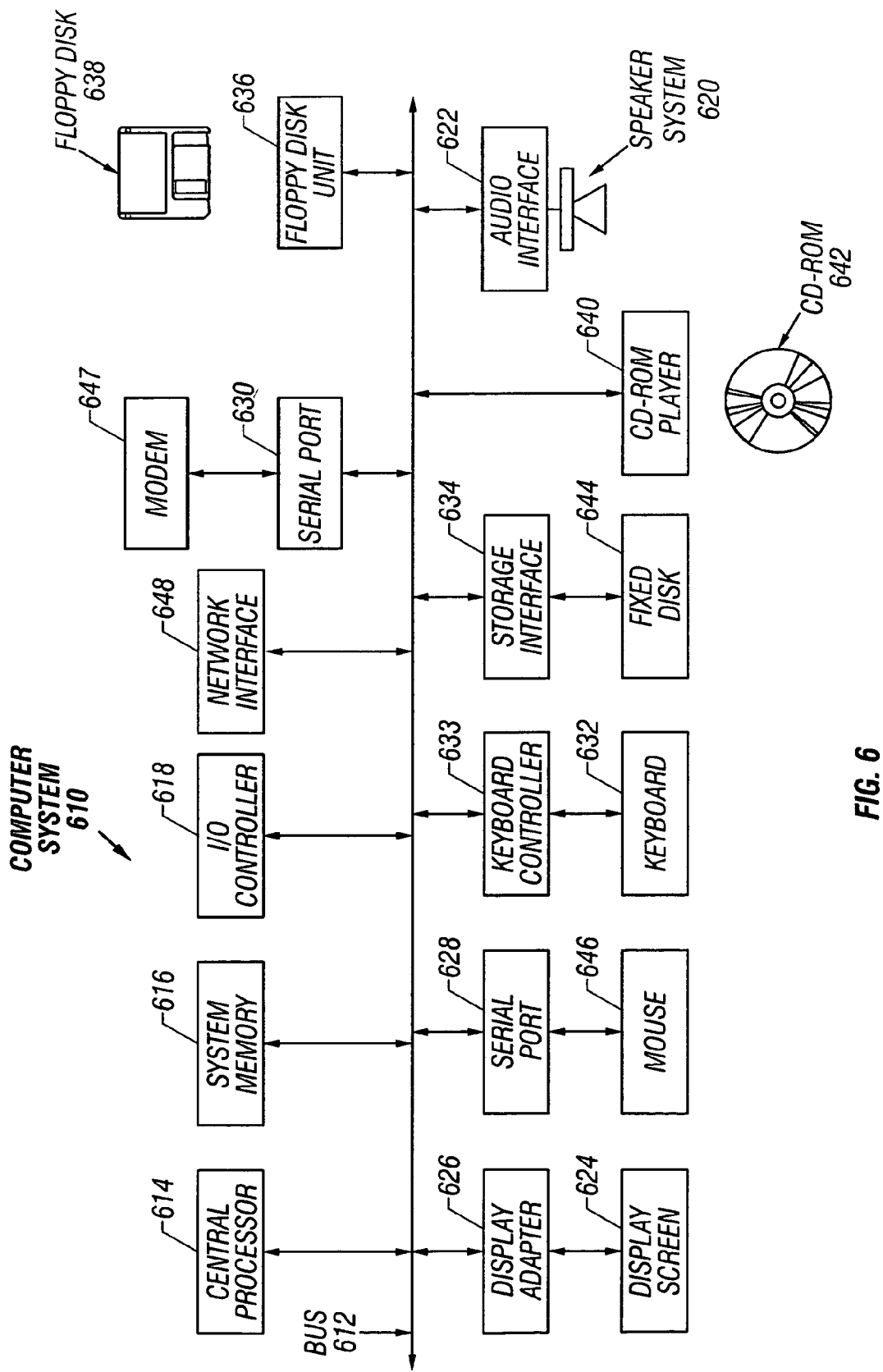
FIG. 6 is a block diagram illustrating a computer system suitable for implementing embodiments of the present invention.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)-(N) that are accessible by client computers 620(1)-(N). Communication between client computers 620(1)-(N) and servers 610(1)-(N) typically occurs over a publicly accessible network, such as a public switched telephone network (PSTN), a DSL connection, a cable modem connection or large bandwidth trunks (e.g., communications channels providing T1 or OC3 service). Client computers 620(1)-(N) access servers 610(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)-(N).

One or more of client computers 620(1)-(N) and/or one or more of servers 610(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 620(1)-(N) is shown in detail in FIG. 7.

Figure 7:
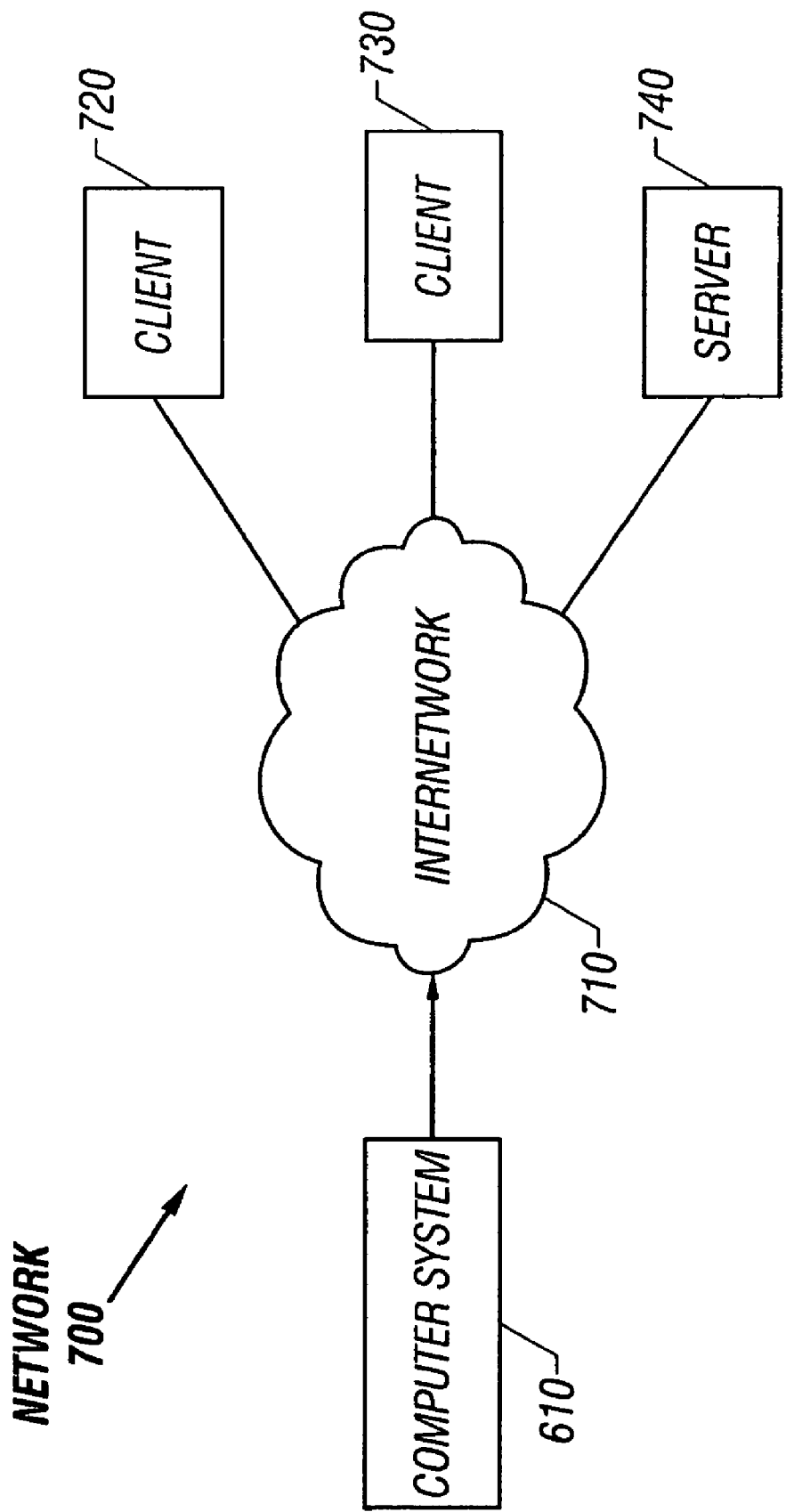
FIG. 7 is a block diagram illustrating the interconnection of the computer system of FIG. 6 to client and host systems.

FIG. 7 depicts a block diagram of a computer system 710 suitable for implementing the present invention, and example of one or more of client computers 620(1)-(N). Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

FIG. 8 is a block diagram depicting a network 800 in which computer system 710 is coupled to an internetwork 810, which is coupled, in turn, to client systems 820 and 830, as well as a server 840. Internetwork 810 (e.g., the Internet) is also capable of coupling client systems 820 and 830, and server 840 to one another. With reference to computer system 710, modem 747, network interface 748 or some other method can be used to provide connectivity from computer system 710 to internetwork 810. Computer system 710, client system 820 and client system 830 are able to access information on server 840 using, for example, a web browser (not shown). Such a web browser allows computer system 710, as well as client systems 820 and 830, to access data on server 840 representing the pages of a website hosted on server 840. Protocols for exchanging data via the Internet are well known to those skilled in the art. Although FIG. 8 depicts the use of the Internet for exchanging data, the present invention is not limited to the Internet or any particular network-based environment.

Referring to FIGS. 6, 7 and 8, a browser running on computer system 710 employs a TCP/IP connection to pass a request to server 840, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:

receiving an incoming customer support request at a channel driver, wherein
    said channel driver is in communication with a communication channel,
    a media type of said communication channel is one of a plurality of media types, and
    said channel driver is configured to communicate with said communication channel using said media type;

in response to said receiving said incoming customer support request,
    forming a message, wherein
    said forming comprises
        inserting customer relations management system information into said message, and
        configuring said message to be communicated to a communication server by encoding at least a portion of said message in a standard format, wherein
        said standard format is independent of said media type of said communication channel,
        said standard format conforms to a data format specification,
        said communication server and said channel driver are configured to recognize said standard format, and
        said data format specification defines a plurality of interactions between said communication server and said channel driver;

communicating said message between said communication server and said channel driver, wherein
    said message is configured to transport said customer relations management system information between said communication server and said channel driver, and
    said communicating is performed according to said data format specification;

receiving said message at said communication server, wherein
    said communication server receives said message from said channel driver,
    said receiving is performed in a media-independent manner by virtue of said communication server and said channel driver being configured to communicate according to said data format specification, and
    said communication server and said channel driver being configured to communicate according to said data format specification allows said communication server and said channel driver to be configured separately; and causing said communication server to route said incoming customer support request to an agent, wherein
said communication server is configured to route said incoming customer support request to said agent by virtue of being configured to route said customer relations management system information to a browser coupled to said agent,
said causing routes said incoming customer support request to said agent as a work item,
said causing comprises pushing said customer relations management system information from said communication server in response to said receiving said message,
said customer relations management system information comprises at least one of agent information and work item information,
said agent information comprises information regarding a skill set of an agent, and
said work item information comprises information regarding a task to be performed by said agent.

2. The method of claim 1, further comprising:
inserting a notification into said message, wherein
said notification comprises at least one of notification of an event and autonomously provided information.

3. The method of claim 2, wherein
said customer relations management system information further comprises at least one of queuing information, statistical information, connection information and rule information.

4. The method of claim 1, further comprising:
communicating said message from said communication server to a universal queuing system.

5. The method of claim 1, further comprising:
forming a command; and
inserting said command into said message, wherein said command is defined such that a module receiving said message performs an operation.

6. The method of claim 1, further comprising:
forming a request; and
inserting said request into said message, wherein said request is configured to cause a module receiving said message to reply with requested customer relations management system information.

7. The method of claim 1, further comprising:
forming a notification; and
inserting said notification into said message, wherein said notification is formed by a module forming said message.

8. The method of claim 1, wherein
said message defines a function, and
said function is one of an agent-related function, a work item-related function, a statistics-related function and an administrative function.

9. The method of claim 8, wherein
said agent-related function is initiated by one of an AgentLogin command, an AgentLogout command, an AgentInitAuBWork command, an AgentAllMediaAvailable command, a ChangeAgentMediaMode command, a ChangeAgentSkill command, a RequestAgentState request, a RequestAgentMediaMode request, a RequestSystemState request, a RequestAgentWorkableList request, a RequestWorkItemAssignment request, a RequestAgentWorkItemList request and a RequestAgentMediaState request.

10. The method of claim 8, wherein
said work item-related function is initiated by one of an AddWorkItem command, a RequestWorkItemStatus request, an AcceptWorkItem command, a RejectWorkItem command, a CompleteWorkItem command, a WrapUpWorkItemResponse command, a WrapCompleteWorkItem command, an HoldWorkItem command, an UnHoldWorkItem command, a BlindTransferWorkItemToAgent command, a TransferWorkItemToAgent command and a TransferWorkItemToRoute command.

11. The method of claim 8, wherein
said statistics-related function is initiated by one of a SetChannelStatInterval command, a SetRouteStatInterval command, a StartAgentStat command, a StopAgentStat command and a GetSystemStatistics request.

12. The method of claim 8, wherein
said administrative function is initiated by one of a UQOpenConnection command, a UQReopenConnection command, a UQInitRules command, a UQReplaceRules command and a UQDisconnect command.

13. The method of claim 1, wherein forming said message further comprises:
packaging and un-packaging said customer relations management system information using a data transfer protocol.

14. The method of claim 1, wherein
an interface between said communication server and a plurality of channel drivers is configured to provide communication between said communication server and said channel drivers,
said channel drivers comprise said channel driver,
each of said channel drivers is configured to be coupled to at least one of a plurality of communication channels,
said communication channels comprise said communication channel, and
a media type of each communication channel is one of said media types.

15. A computer system comprising:
a processor;
computer readable storage medium coupled to said processor; and
computer code, encoded in said computer readable storage medium, configured to cause said processor to:
receive an incoming customer support request at a channel driver, wherein
said channel driver is in communication with a communication channel,
a media type of said communication channel is one of a plurality of media types, and
said channel driver is configured to communicate with said communication channel using said media type;
form a message, in response to said receiving said incoming customer support request, wherein
said forming comprises
inserting customer relations management system information into said message, and
configuring said message to be communicated to a communication server by encoding at least a portion of said message in a standard format, wherein
said standard format is independent of said media type of said communication channel,
said standard format conforms to a data format specification, said communication server and said channel driver are configured to recognize said standard format, and said data format specification defines a plurality of interactions between said communication server and said channel driver;

communicate said message between said communication server and said channel driver, wherein said message is configured to transport said customer relations management system information between said communication server and said channel driver, and said communicating is performed according to said data format specification;

receive said message at said communication server, wherein said communication server receives said message from said channel driver, said receiving is performed in a media-independent manner by virtue of said communication server and said channel driver being configured to communicate according to said data format specification, and said communication server and said channel driver being configured to communicate according to said data format specification allows said communication server and said channel driver to be configured separately; and cause said communication server to route said incoming customer support request to an agent, wherein said communication server is configured to route said incoming customer support request to said agent by virtue of being configured to route said customer relations management system information to a browser coupled to said agent, said causing routes said incoming customer support request to said agent as a work item, said causing comprises pushing said customer relations management system information from said communication server in response to said receiving said message, said customer relations management system information comprises at least one of agent information and work item information, said agent information comprises information regarding a skill set of an agent, and said work item information comprises information regarding a task to be performed by said agent.

16. The computer system of claim 15, wherein said computer code is further configured to cause said processor to:

insert a notification into said message, wherein said notification comprises at least one of notification of an event and autonomously provided information.

17. The computer system of claim 16, wherein said customer relations management system information further comprises at least one of queuing information, statistical information, connection information and rule information.

18. The computer system of claim 15, wherein said computer code is further configured to cause said processor to:

communicate said message from said communication server to a universal queuing system.

19. The computer system of claim 15, wherein said computer code is further configured to cause said processor to:

form a command; and insert said command into said message, wherein said command is defined such that a module receiving said message performs an operation.

20. The computer system of claim 15, wherein said computer code is further configured to cause said processor to:

form a request; and insert said request into said message, wherein said request is configured to cause a module receiving said message to reply with requested customer relations management system information.

21. The computer system of claim 15, wherein said computer code is further configured to cause said processor to:

form a notification; and insert said notification into said message, wherein said notification is formed by a module forming said message.

22. The computer system of claim 15, wherein said message defines a function, and said function is one of an agent-related function, a work item-related function, a statistics-related function and an administrative function.

23. The computer system of claim 15, wherein said computer code is further configured to cause said processor to:

package and un-package said customer relations management system information using a data transfer protocol.

24. The computer system of claim 15, wherein an interface between said communication server and a plurality of channel drivers is configured to provide communications between said communication server and said channel drivers, said channel drivers comprise said channel driver, each of said channel drivers is configured to be coupled to at least one of a plurality of communication channels, said communication channels comprise said communication channel, and a media type of each communication channel is one of said media types.

25. A computer program product comprising:

a first set of instructions, executable on a computer system, configured to receive an incoming customer support request at a channel driver, wherein said channel driver is in communication with a communication channel, a media type of said communication channel is one of a plurality of media types, and said channel driver is configured to communicate with said communication channel using said media type;

a second set of instructions, executable on a computer system, configured to form a message, in response to said receiving said incoming customer support request, wherein said second set of instructions comprises a first subset of instructions, executable on a computer system, configured to insert customer relations management system information into said message, and a second subset of instructions, executable on a computer system, configured to configure said message to be communicated to a communication server, wherein said second subset of instructions comprises a first sub-subset of instructions, executable on a computer system, configured to encode at least a portion of said message in a standard format, wherein said standard format is independent of said media type of said communication channel, said standard format conforms to a data format specification, said communication server and said channel driver are configured to recognize said standard format, and said data format specification defines a plurality of interactions between said communication server and said channel driver;

a third set of instructions, executable on a computer system, configured to communicate said message between said communication server and said channel driver, wherein said message is configured to transport said customer relations management system information between said communication server and said channel driver, and said communicating is performed according to said data format specification;

a fourth set of instructions, executable on a computer system, configured to receive said message at said communication server, wherein said communication server receives said message from said channel driver, said receiving is performed in a media-independent manner by virtue of said communication server and said channel driver being configured to communicate according to said data format specification, and said communication server and said channel driver being configured to communicate according to said data format specification allows said communication server and said channel driver to be configured separately;

a fifth set of instructions, executable on a computer system, configured to cause said communication server to route said incoming customer support request to an agent, wherein said communication server is configured to route said incoming customer support request to said agent by virtue of being configured to route said customer relations management system information to a browser coupled to said agent, said causing routes said incoming customer support request to said agent as a work item, said causing comprises pushing said customer relations management system information from said communication server in response to said receiving said message, said customer relations management system information comprises at least one of agent information and work item information, said agent information comprises information regarding a skill set of an agent, and said work item information comprises information regarding a task to be performed by said agent; and computer readable storage media, wherein said computer program product is encoded in said computer readable storage media.

26. The computer program product of claim 25, wherein said computer program product further comprises:

a sixth set of instructions, executable on a computer system, configured to insert a notification into said message, wherein said notification comprises at least one of notification of an event and autonomously provided information.

27. The computer program product of claim 26, wherein said customer relations management system information further comprises at least one of queuing information, statistical information, connection information and rule information.

28. The computer program product of claim 25, wherein said computer program product further comprises:

a sixth set of instructions, executable on a computer system, configured to communicate said message from said communication sever to a universal queuing system.

29. The computer program product of claim 25, wherein said computer program product further comprises:

a sixth set of instructions, executable on a computer system, configured to form a command; and a seventh set of instructions, executable on a computer system, configured to insert said command into said message, wherein said command is defined such that a module receiving said message performs an operation.

30. The computer program product of claim 25, wherein said computer program product further comprises:

a sixth set of instructions, executable on a computer system, configured to form a request; and a seventh set of instructions, executable on a computer system, configured to insert said request into said message, wherein said request is configured to cause a module receiving said message to reply with requested customer relations management system information.

31. The computer program product of claim 25, wherein said computer program product further comprises:

a sixth set of instructions, executable on a computer system, configured to form a notification;

a seventh set of instructions, executable on a computer system, configured to insert said notification into said message, wherein said notification is formed by a module forming said message.

32. The computer program product of claim 25, wherein said message defines a function, and said function is one of an agent-related function, a work item-related function, a statistics-related function and an administrative function.

33. The computer program product of claim 25, wherein said computer program product further comprises:

a sixth set of instructions, executable on a computer system, configured to package and un-package said customer relations management system information using a data transfer protocol.

34. The computer program product of claim 25, wherein an interface between said communication server and a plurality of channel drivers is configured to provide communication between said communication server and said channel drivers, said channel drivers comprise said channel driver, each of said channel drivers is configured to be coupled to at least one of a plurality of communication channels, said communication channels comprise said communication channel, and a media type of each communication channel is one of said media types.

35. An apparatus comprising:

a processor;

means for receiving an incoming customer support request at a channel driver, wherein said channel driver is in communication with a communication channel, a media type of said communication channel is one of a plurality of media types, and said channel driver is configured to communicate with said communication channel using said media type;
means for forming a message, in response to said receiving said incoming customer support request, wherein
said means for forming said message is communicatively coupled to said processor,
said means for forming comprises
means for inserting customer relations management system information into said message, and
means for configuring said message to be communicated to a communication server, wherein
said means for configuring comprises a means for encoding at least a portion of said message in a standard format,
said standard format is independent of said media type of said communication channel,
said standard format conforms to a data format specification,
said communication server and said channel driver are configured to recognize said standard format, and
said data format specification defines a plurality of interactions between said communication server and said channel driver;
means for communicating said message between said communication server and said channel driver, wherein
said message is configured to transport said customer relations management system information between said communication server and said channel driver, and
said communicating is performed according to said data format specification;
means for receiving said message at said communication server, wherein
said communication server receives said message from said channel driver,
said receiving is performed in a media-independent manner by virtue of said communication server and said channel driver being configured to communicate according to said data format specification, and
said communication server and said channel driver being configured to communicate according to said data format specification allows said communication server and said channel driver to be configured separately; and
means for causing said communication server to route said incoming customer support request to an agent, wherein
said means for causing routes said incoming customer support reuuest to said agent by virtue of being configured to route said customer relations management system information to a browser coupled to said agent,
said means for causing routes said incoming customer support request to said agent as a work item,
said means for causing comprises means for pushing said customer relations management system information from said communication server in response to receipt of said message,
said customer relations management system information comprises at least one of agent information and work item information,
said agent information comprises information regarding a skill set of an agent, and
said work item information comprises information regarding a task to be performed by said agent.

36. The apparatus of claim 35, further comprising:
means for inserting a notification into said message, wherein
said notification comprises at least one of notification of an event and autonomously provided information.

37. The apparatus of claim 36, wherein
said customer relations management system information further comprises at least one of queuing information, statistical information, connection information and rule information.

38. The apparatus of claim 35, further comprising:
means for communicating said message from said communication server to a universal queuing system.

39. The apparatus of claim 35, further comprising:
means for forming a command; and
means for inserting said command into said message, wherein said command is defined such that a module receiving said message performs an operation.

40. The apparatus of claim 35, further comprising:
means for forming a request; and
means for inserting said request into said message, wherein said request is configured to cause a module receiving said message to reply with requested customer relations management system information.

41. The apparatus of claim 35, further comprising:
means for forming a notification; and
means for inserting said notification into said message, wherein said notification is formed by a module forming said message.

42. The apparatus of claim 35, wherein
said message defines a function, and
said function is one of an agent-related function, a work item-related function, a statistics-related function and an administrative function.

43. The apparatus of claim 35, further comprises:
means for packaging and un-packaging said customer relations management system information using a data transfer protocol.

44. The apparatus of claim 35, wherein
an interface between said communication server and a plurality of channel drivers is configured to provide communication between said communication server and said channel drivers,
said channel drivers comprise said channel driver,
each of said channel drivers is configured to be coupled to at least one of a plurality of communication channels,
said communication channels comprise said communication channel, and
a media type of each communication channel is one of said media types.

45. A method comprising:
receiving a communication from an agent at a communication server, wherein
said communication from said agent is received in response to a customer support request,
said communication server is configured to communicate with a channel driver,
said channel driver is in communication with a communication channel,
a media type of said communication channel is one of a plurality of media types, and
said channel driver is configured to communicate with said communication channel using said media type;
in response to receiving said communication from said agent,
forming a message, wherein
said forming comprises inserting customer relations management system information into said message, wherein
said customer relations management system information comprises at least one of agent information and work item information,
said agent information comprises information regarding a skill set of an agent, and
said work item information comprises information regarding a task to be performed by said agent, and
configuring said message to be communicated to said channel driver by encoding at least a portion of said message in a standard format, wherein
said standard format conforms to a data format specification,
said communication server and said channel driver are configured to recognize said standard format, and
said data format specification defines a plurality of interactions between said communication server and said channel driver;
communicating said message between said communication server and said channel driver, wherein
said message is configured to transport said customer relations management system information between said communication server and said channel driver, and
said communicating is performed according to said data format specification;
receiving said message at said channel driver, wherein
said channel driver receives said message from said communication server,
said receiving is performed in a media-independent manner by virtue of said communication server and said channel driver being configured to communicate according to said data format specification, and
said communication server and said channel driver being configured to communicate according to said data format specification allows said communication server and said channel driver to be configured separately; and
causing said channel driver to route said communication from said agent to said communication channel, wherein
said channel driver is configured to route said communication to said communication channel by virtue of being configured to route said customer relations management system information to said communication channel, and
said causing comprises communicating said customer relations management system information from said channel driver, in response to said receiving said message.

46. The method of claim 45, further comprising:
inserting a notification into said message, wherein
said notification comprises at least one of notification of an event and autonomously provided information.

47. The method of claim 46, wherein
said customer relations management system information further comprises at least one of queuing information, statistical information, connection information and rule information.

48. The method of claim 45, further comprising:
performing an operation in response to receiving a command.

49. The method of claim 45, further comprising:
replying with requested customer relations management system information in response to receiving said message.

50. The method of claim 45, further comprising:
inserting a notification into said message, wherein said notification is generated by a module forming said message.

51. The method of claim 45, wherein
said message defines a function, and
said function is one of an agent-related function, a work item-related function, a statistics-related function and an administrative function.

52. A computer system comprising:
a processor;
computer readable storage medium coupled to said processor; and
computer code, encoded in said computer readable storage medium, configured to cause said processor to:
receive a communication from an agent at a communication server, wherein
said communication from said agent is received in response to a customer support request,
said communication server is configured to communicate with a channel driver,
said channel driver is in communication with a communication channel,
a media type of said communication channel is one of a plurality of media types, and
said channel driver is configured to communicate with said communication channel using said media type;
form a message, in response to receiving said communication from said agent, wherein
said forming comprises
inserting customer relations management system information into said message, wherein
said customer relations management system information comprises at least one of agent information and work item information,
said agent information comprises information regarding a skill set of an agent, and
said work item information comprises information regarding a task to be performed by said agent, and
configuring said message to be communicated to said channel driver by encoding at least a portion of said message in a standard format, wherein
said standard format conforms to a data format specification,
said communication server and said channel driver are configured to recognize said standard format, and
said data format specification defines a plurality of interactions between said communication server and said channel driver;
communicate said message between said communication server and said channel driver, wherein
said message is configured to transport said customer relations management system information between said communication server and said channel driver, and
said communicating is performed according to said data format specification;
receive said message at said channel driver, wherein
said channel driver receives said message from said communication driver, said receiving is performed in a media-independent manner by virtue of said communication server and said channel driver being configured to communicate according to said data format specification, and said communication server and said channel driver being configured to communicate according to said data format specification allows said communication server and said channel driver to be configured separately; and cause said channel driver to route said communication from said agent to said communication channel, wherein said channel driver is configured to route said communication to said communication channel by virtue of being configured to route said customer relations management system information to said communication channel, and said causing comprises communicating said customer relations management system information from said channel driver, in response to said receiving said message.

53. The computer system of claim 52, wherein said computer code is further configured to cause said processor to:

insert a notification into said message, wherein said notification comprises at least one of notification of an event and autonomously provided information.

54. The computer system of claim 53, wherein said customer relations management system information further comprises at least one of queuing information, statistical information, connection information and rule information.

55. The computer system of claim 52, wherein said computer code is further configured to cause said processor to:

perform an operation in response to receiving a command.

56. The computer system of claim 52, wherein said computer code is further configured to cause said processor to:

reply with requested customer relations management system information in response to receiving said message.

57. The computer system of claim 52, wherein said computer code is further configured to cause said processor to:

insert a notification into said message, wherein said notification is generated by a module forming said message.

58. The computer system of claim 52, wherein said message defines a function, and said function is one of an agent-related function, a work item-related function, a statistics-related function and an administrative function.

59. A computer program product comprising:

a first set of instructions, executable on a computer system, configured to receive a communication from an agent at a communication server, wherein said communication from said agent is received in response to a customer support request, said communication server is configured to communicate with a channel driver, said channel driver is in communication with a communication channel, a media type of said communication channel is one of a plurality of media types, and said channel driver is configured to communicate with said communication channel using said media type;

a second set of instructions, executable on a computer system, configured to form a message, in response to receiving said communication from said agent, wherein said forming comprises inserting customer relations management system information into said message, wherein said customer relations management system information comprises at least one of agent information and work item information, said agent information comprises information regarding a skill set of an agent, and said work item information comprises information regarding a task to be performed by said agent, and configuring said message to be communicated to said channel driver by encoding at least a portion of said message in a standard format, wherein said standard format conforms to a data format specification, said communication server and said channel driver are configured to recognize said standard format, and said data format specification defines a plurality of interactions between said communication server and said channel driver;

a third set of instructions, executable on a computer system, configured to communicate said message between said communication server and said channel driver, wherein said message is configured to transport said customer relations management system information between said communication server and said channel driver, and said communicating is performed according to said data format specification;

a fourth set of instructions, executable on a computer system, configured to receive said message at said channel driver, wherein said channel driver receives said message from said communication server, said receiving is performed in a media-independent manner by virtue of said communication server and said channel driver being configured to communicate according to said data format specification, and said communication server and said channel driver being configured to communicate according to said data format specification allows said communication server and said channel driver to be configured separately;

a fifth set of instructions, executable on a computer system, configured to cause said channel driver to route said communication from said agent to said communication channel, wherein said channel driver is configured to route said communication to said communication channel by virtue of being configured to route said customer relations management system information to said communication channel, and said causing comprises communicating said customer relations management system information from said channel driver, in response to said receiving said message; and computer readable storage media, wherein said computer program product is encoded in said computer readable storage media.

60. The computer program product of claim 59, wherein said computer program product further comprises:

a sixth set of instructions, executable on a computer system, configured to insert a notification into said message, wherein said notification comprises at least one of notification of an event and autonomously provided information.

61. The computer program product of claim 59, wherein said customer relations management system information further comprises at least one of queuing information, statistical information, connection information and rule information.

62. The computer program product of claim 59, wherein said computer program product further comprises:
    a sixth set of instructions, executable on a computer system, configured to perform an operation in response to receiving a command.

63. The computer program product of claim 59, wherein said computer program product further comprises:
    a sixth set of instructions, executable on a computer system, configured to reply with requested customer relations management system information in response to receiving said message.

64. The computer program product of claim 59, wherein said computer program product further comprises:
    a sixth set of instructions, executable on a computer system, configured to insert a notification into said message, wherein said notification is generated by a module forming said message.

65. The computer program product of claim 59, wherein said message defines a function, and
    said function is one of an agent-related function, a work item-related function, a statistics-related function and an administrative function.

66. An apparatus comprising:
    a processor; and
    means for receiving a communication from an agent at a communication server, wherein
        said communication from said agent is received in response to a customer support request,
        said communication server is configured to communicate with a channel driver,
        said channel driver is in communication with a communication channel,
        a media type of said communication channel is one of a plurality of media types, and
        said channel driver is configured to communicate with said communication channel using said media type;
    means for forming a message, in response to receiving said communication from said agent, wherein
        said means for forming is communicatively coupled to said processor,
        said means for forming comprises
            means for inserting customer relations management system information into said message, wherein
                said customer relations management system information comprises at least one of agent information and work item information.
                said agent information comprises information regarding a skill set of an agent, and
                said work item information comprises information regarding a task to be performed by said agent, and
            means for configuring said message to be communicated to said channel driver by encoding at least a portion of said message in a standard format, wherein
                said standard format conforms to a data format specification,
                said communication server and said channel driver are configured to recognize said standard format, and
                said data format specification defines a plurality of interactions between said communication server and said channel driver;
    means for communicating said message between said communication server and said channel driver, wherein
        said message is configured to transport said customer relations management system information between said communication server and said channel driver, and
        said communicating is performed according to said data format specification;
    means for receiving said message at said channel driver, wherein
        said channel driver receives said message from said communication server,
        said receiving is performed in a media-independent manner by virtue of said communication server and said channel driver being configured to communicate according to said data format specification, and
        said communication server and said channel driver being configured to communicate according to said data format specification allows said communication server and said channel driver to be configured separately,
    means for causing said channel driver to route said communication from said agent to said communication channel, wherein
        said channel driver is configured to route said communication to said communication channel by virtue of being configured to route said customer relations management system information to said communication channel, and
        said causing comprises communicating said customer relations management system information from said channel driver, in response to said receiving said message.

67. The apparatus of claim 66, further comprising:
    means for inserting a notification into said message, wherein
        said notification comprises at least one of notification of an event and autonomously provided information.

68. The apparatus of claim 67, wherein
    said customer relations management system information further comprises at least one of queuing information, statistical information, connection information and rule information.

69. The apparatus of claim 66, further comprising:
    means for performing an operation in response to receiving a command.

70. The apparatus of claim 66, further comprising:
    means for replying with requested customer relations management system information in response to receiving said message.

71. The apparatus of claim 66, further comprising:
    means for inserting a notification into said message, wherein said notification is generated by a module forming said message.

72. The apparatus of claim 66, wherein
    said message defines a function, and
    said function is one of an agent-related function, a work item-related function, a statistics-related function and an administrative function.

* * * * *